(12) United States Patent
Egan

(10) Patent No.: US 8,380,603 B2
(45) Date of Patent: Feb. 19, 2013

(54) GUARANTEED PRINCIPAL INVESTMENT SYSTEM, PRODUCT AND METHOD

(76) Inventor: George Egan, Concord, CA (US)

( * ) Notice: Subject to any disclaimer, the term of this patent is extended or adjusted under 35 U.S.C. 154(b) by 149 days.

(21) Appl. No.: 12/783,463

(22) Filed: May 19, 2010

(65) Prior Publication Data

US 2010/0274738 A1    Oct. 28, 2010

Related U.S. Application Data

(63) Continuation-in-part of application No. 11/801,569, filed on May 10, 2007, now Pat. No. 7,769,664.

(51) Int. Cl.
*G06Q 40/00* (2006.01)
(52) U.S. Cl. .................................... 705/36 R; 705/35
(58) Field of Classification Search ............ 705/36 R, 705/35, 37, 38, 36 T, 4, 40, 39, 26.5, 26.7, 705/26.1, 1.1, 7.11, 7.29, 14.1; 345/440
See application file for complete search history.

(56) References Cited

U.S. PATENT DOCUMENTS

| | | | | |
|---|---|---|---|---|
| 6,578,016 | B1* | 6/2003 | Trankina et al. ................. | 705/39 |
| 7,127,423 | B2* | 10/2006 | Dunning et al. ............ | 705/36 R |
| 7,769,664 | B2* | 8/2010 | Egan ............................ | 705/36 R |
| 2002/0059123 | A1* | 5/2002 | Dunning et al. ................. | 705/35 |
| 2002/0103852 | A1* | 8/2002 | Pushka .......................... | 709/203 |
| 2002/0174042 | A1* | 11/2002 | Arena et al. ..................... | 705/35 |
| 2002/0174046 | A1* | 11/2002 | Mistretta ......................... | 705/36 |
| 2005/0216316 | A1* | 9/2005 | Brisbois et al. ................... | 705/4 |
| 2005/0246260 | A1* | 11/2005 | Hodgdon et al. ............... | 705/36 |
| 2006/0116941 | A1* | 6/2006 | Lombardo ...................... | 705/35 |
| 2006/0229964 | A1* | 10/2006 | Fox ................................ | 705/35 |
| 2006/0282355 | A1* | 12/2006 | Canezin et al. ................. | 705/35 |
| 2007/0100726 | A1* | 5/2007 | O'Flinn et al. .............. | 705/36 R |
| 2007/0143199 | A1* | 6/2007 | Stiff et al. .................... | 705/36 R |
| 2008/0071697 | A1* | 3/2008 | Midlam et al. .............. | 705/36 R |
| 2008/0109341 | A1* | 5/2008 | Stiff et al. ................... | 705/36 R |
| 2008/0281761 | A1* | 11/2008 | Egan ........................... | 705/36 R |
| 2010/0274738 | A1* | 10/2010 | Egan ........................... | 705/36 R |

OTHER PUBLICATIONS

Schneider, Steven "Use SP annuities for longer term buys.(single premium annuities)" Jul. 21, 1997 National Underwriter Life & Health-Financial Services Edition , v101 , n29 , p. 13(2).*
Koco, Linda "Union Central's 2nd indexed product—An EIUL" Sep. 29, 1997 National Underwriter (Life/Health/Financial Services) v101n39 pp. 13, 24.*
Horwitz, Edward J "EIAs still provide competitive potential" Jan. 11, 1999 National Underwriter (Life/Health/Financial Services) v103n2 pp. 13, 17.*

* cited by examiner

*Primary Examiner* — Kelly Campen

(57) ABSTRACT

A computer-implemented investment system and methods provide a guaranteed principal amount such as a fixed annuity while offering a possibility of higher returns found in a broad equity index fund to investors. A sum certain guaranteed principal investment calculation system and a calculate investor profile command that is customizable by a user can provide an investment strategy tailored to the user based on his profile data and scope of investment. The investment system allows a customizable application system to interface with investment clients, to correlate data with metadata and other criteria, and to display queried data. In one aspect, the investment system can provide a relational database management system that has a relational data repository for storing investment fact data, an aggregation module to present at least a non-guaranteed principal portion and a guaranteed principal portion per investment portfolio product, and a query servicing module to a user.

18 Claims, 18 Drawing Sheets

Investment Portfolio 800

Client System Investment Portfolio Method 900

Investment Portfolio Method 1000

Computer Readable Medium Including Program Code for an Investment Portfolio Method 1100

GUARANTEED PRINCIPAL INVESTMENT SYSTEM, PRODUCT AND METHOD

CROSS REFERENCES TO RELATED APPLICATIONS

This application claims priority to and is a continuation in part of U.S. patent application Ser. No. 11/801,569, "GUARANTEED PRINCIPAL INVESTMENT SYSTEM, PRODUCT AND METHOD," filed May 10, 2007, now U.S. Pat. No. 7,769,664 which is incorporated entirely herein by reference.

BACKGROUND

The subject matter herein relates generally to a system and method for providing investment products comprising a plurality of equity and index annuity portfolio allocations in a single insurance and securities investment product. Further, the subject matter also relates generally to a computer system and a web application wherein an investor selects the desired amount of investment principal to be guaranteed and a corresponding allocation of equity and equity-indexed annuity investments. Additionally the present disclosure relates to a system and method of selecting the amount of guaranteed investment principal with a corresponding equity and equity-index annuity portfolio allocation using a web application and computer system embodied therein. The present disclosure relates more specifically to investment principal guaranteed investment products and a method for determining specific amounts of investment principal guarantee with respect to a selected desired rate of return. More particularly, the present disclosure provides for an investment system with greater than none and about 100% of all investment principal guaranteed.

Annuities are well-known in the financial services industry. They are characterized by an accumulation phase and a payout phase. During the accumulation phase, the annuity owner makes one or more payments into the annuity account and the annuity account value fluctuates based on the performance of one or more predetermined investment selections. These investment selections may be made with money pooled from a plurality of said annuity accounts and may contain fixed return or variable rate investment products. During the payout phase, the annuity account value is returned to the annuity owner, often as part of an income plan wherein the annuity owner will receive a specified number of income payments for a predetermined time period based on the value of the annuity account.

Income plans are available in many forms. For example, the distributions may be made for a predetermined definite period, as in an annuity certain, or for as long as the person lives, as in a life annuity. Payments under a life annuity may terminate on the policy holder's death, as in a straight life annuity, or may continue to a beneficiary for a specified period after the policy holder's death, as in a life annuity with period certain. Alternatively, a life annuity may be based on two lives jointly, as in a joint and last-survivor annuity in which payments continue to be made to the survivor for the remainder of his or her life, or may provide a beneficiary a lump sum payment upon the death of the policy holder. The payments under an annuity may be set to begin on the purchase date of the annuity, as in an immediate annuity, or after a specified amount of time, as in a deferred annuity.

Annuities are typically conservative investments providing a low risk return on investment. By coupling annuities with equity or stock based investments, the total return to an investor may be more uncertain or erratic, depending on the allocation. However, one solution is an equity-indexed annuity which is also well known in the art. An equity-indexed annuity is linked to an index fund such as the Standard and Poors 500 Index (S&P 500). When the index fund increases in value, so does the value in the annuity account depending on the interest earnings of the annuity account. If the index fund drops in value, the principal amount in the annuity account is protected to a guaranteed minimum by a contract with an annuity provider such as a life insurance company. Loss of some principal is possible if the annuity is surrendered before the end of the term of the contract. One disadvantage of an annuity as described here is that there is no ability for the investor to determine the amount of the guaranteed principal. Instead, the investor selects a desired rate of return or the degree of risk. As a result, the amount of guaranteed principal is dependant on the selections therein.

Because the interest rate of a fixed annuity is locked for the guarantee period, investors feel disadvantaged if the prevailing interest rates available in alternative investment products increase during the guarantee period while the fixed annuity is locked in at a lower rate. For this reason, fixed annuities are not a desirable investment option for many consumers of investment products; the consumers fear being locked into an interest rate that may, during the guarantee period, be lower than prevailing interest rates available in other investment products. Variable annuities obviate this problem because the variable annuity is not locked into a guaranteed interest rate. Through a variable annuity, the investor can participate in bond, equity, and money markets and thereby reap the benefits of upturns in those markets. On the other hand, such investments involve more risk and volatility than guaranteed fixed annuities, and, in addition to reaping the benefits of upturns, the investor must suffer through downturns in the markets underlying the variable account as well. Accordingly, the variable annuities may not be desirable for some investors, especially investors operating under relatively short investment time horizons.

Therefore, a need exists for an investment system and method that provides a guaranteed principal amount, as in a fixed annuity, while offering the possibility of higher returns as found in a broad equity index fund.

SUMMARY OF THE INVENTION

The present invention is directed to a guaranteed principal investment system, product and method that provides for the security of a guaranteed principal while offering the possibility of higher returns as found in a broad equity index fund.

In one embodiment, an investment system comprises a plurality of investment portfolio products, a plurality of target risk profiles, at least one non-guaranteed principal portion per investment portfolio product, and at least one guaranteed principal portion per investment portfolio product wherein said guaranteed and non-guaranteed principal portions equal a fixed allocation investment portfolio product.

In another embodiment, the non-guaranteed principal portion of an investment portfolio product is coupled with a guaranteed principal investment portion to provide a return on an initial investment amount, said return comprising at least a predetermined sum certain principal amount.

In yet another embodiment, an investment system further comprises a plurality of target risk profiles coupled with the investment portfolio product comprising said investment portfolio products and guaranteed principal portion coupled with a non-guaranteed principal portion to provide a return on an initial investment amount, said return comprising at least a predetermined guaranteed sum certain principal amount.

In another embodiment, an investment portfolio product further comprises at least one non-guaranteed principal portion and at least one guaranteed principal portion, wherein the guaranteed principal portion coupled with the non-guaranteed principal portion provide an enhanced market return on an initial investment amount, said return comprising at least a predetermined guaranteed sum certain principal amount.

In another embodiment, the investment system further comprises a plurality of investment portfolio products, a plurality of target risk profiles, a plurality of said investment portfolio products coupled with said target risk profiles wherein the investment system equals a fixed portfolio to provide ease of investment selection.

In yet another embodiment, an investment system wherein a guaranteed principal portion comprised of one or more annuities.

In another embodiment, an investment system wherein a non-guaranteed principal portion includes at least one equity-indexed annuity.

In another embodiment, an investment system wherein the non-guaranteed principal portion is a mutual fund, an exchange traded fund, an individual stock, a commodity or a stock option.

In another embodiment, the investment system further comprises one or more investor-selected total investment amounts, one or more investor-selected percentages of guaranteed principal, and one or more investor-selected guaranteed principal annuities.

In yet another embodiment, the investment system wherein a guaranteed sum certain principal that is greater than zero and less than the initial investment.

In another embodiment, a method of providing an investment portfolio comprises the following steps in any order: selecting at least one non-guaranteed investment, selecting at least on guaranteed investment, selecting a degree of investment risk, selecting a guaranteed sum certain principal percentage wherein the investment portfolio provides a market rate of return amount and a guaranteed sum certain principal amount, said guaranteed sum certain principal amount being less than an initial investment amount.

In another embodiment, a method of providing an investment portfolio wherein the non-guaranteed investment is a mutual fund, an exchange traded fund, an individual stock, a commodity or a stock option.

In another embodiment, a method of providing an investment portfolio further comprising the following steps in any order: determining a percentage guaranteed based on a guaranteed principal portion of a total investment amount, relating the percentage guarantee to a degree of risk, determining an investor risk profile based on the degree of risk and the guaranteed principal, displaying the investor profile, selecting one or more guaranteed sum certain principal investment portions correlating to the investor profile, and selecting one or more non-guaranteed principal portions based on the investor profile, wherein the investment portfolio returns an amount based on the degree of risk, said amount comprising a first portion of a guaranteed sum certain principal and a second portion of a non-guaranteed investment return.

In yet another embodiment, a method of providing an investment portfolio comprises displaying a graph or chart on an electronic video display.

In another embodiment, a method of providing an investment portfolio wherein the guaranteed sum certain principal investment comprises one or more annuities.

In another embodiment, a method of providing an investment portfolio wherein the non-guaranteed principal investment is a mutual fund, an exchange traded fund, an individual stock, a commodity or a stock option.

In another embodiment, one or more processor readable storage devices having processor readable code embodied on at least one processor readable storage device, said processor readable code for programming at least one processor to perform a method of providing an investment portfolio comprising: selecting at least on non-guaranteed investment, selecting at least one guaranteed sum certain principal initial investment amount, selecting a degree of investment risk, selecting a guaranteed sum certain principal percentage, selecting at lest one initial investment amount, providing a market rate of return amount, and providing a guaranteed sum certain principal amount, said guaranteed sum certain principal amount being less than the total initial investment amount.

In another embodiment, one or more processor readable storage devices having processor readable code embodied on at least one processor readable storage device, said processor readable code for programming at least one processor to perform a method of providing an investment portfolio, wherein the non-guaranteed investment is a mutual fund, an exchange trade fund, an individual stock, a commodity or a stock option.

In another embodiment, one or more processor readable storage devices having processor readable code embodied on at least one processor readable storage device, said processor readable code for programming at least one processor to perform a method of providing an investment portfolio wherein the processor is connected to a computer network.

In yet another embodiment, one or more processor readable storage devices having processor readable code embodied on at least one processor readable storage device, said processor readable code for programming at least one processor to perform a method of providing an investment portfolio, wherein the input/output module is a computer monitor, a PDA or a wireless communications device.

In another embodiment, one or more processor readable storage devices having processor readable code embodied on at least one processor readable storage device, said processor readable code for programming at least one processor to perform a method of providing an investment portfolio wherein the user interface is an Internet browser.

In another embodiment, one or more processor readable storage devices having processor readable code embodied on at least one processor readable storage device, said processor readable code for programming at least one processor to perform a method of providing an investment portfolio wherein the input/output module further displays one or more of the following: an investment portfolio, an equity security, an equity index annuity fund, and a non-guaranteed portion.

In another embodiment, one or more processor readable storage devices having processor readable code embodied on at least one processor readable storage device, said processor readable code for programming at least one processor to perform a method of providing an investment portfolio wherein the input/output module further displays a current principal amount in excess of the guaranteed principal amount, a current investment amount, and a current rate of return interest rate.

In another embodiment, one or more processor readable storage devices having processor readable code embodied on at least one processor readable storage device, said processor readable code for programming at least one processor to perform a method of providing an investment portfolio, said method further comprising: a reset code module for providing a reset function such that the processor calculates a time based investment performance for displaying on the input/output module.

In another embodiment, one or more processor readable storage devices having processor readable code embodied on at least one processor readable storage device, said processor readable code for programming at least one processor to perform a method of providing an investment portfolio wherein the reset code module controls one or more of the following: the guaranteed principal amount, the guaranteed investment, the non-guaranteed investment or a payout period wherein the user changes the parameters of the system.

In another embodiment, a computer system for providing at least one non-guaranteed principal portion wherein a guaranteed principal portion coupled with said non-guaranteed principal portion provide an enhanced market return on a principal investment amount and said enhanced market return comprising at least a guaranteed sum certain principal amount, said computer system comprising a data storage medium for storing instructions; a bus; a memory unit coupled with said bus; a processor coupled with said bus, said processor for executing a computer implemented method for providing an investment portfolio comprising: selecting at least one non-guaranteed investment, selecting at least one guaranteed sum certain principal initial investment amount, selecting a degree of investment risk, selecting a guaranteed sum certain principal percentage, selecting at lest one initial investment amount, providing a market rate of return amount, and providing a guaranteed sum certain principal return amount.

In another embodiment, a computer system for providing at least one non-guaranteed principal portion wherein a guaranteed principal portion coupled with said non-guaranteed principal portion provide an enhanced market return on a principal investment amount and said enhanced market return comprising at least a guaranteed sum certain principal amount, said computer system comprising a data storage medium for storing instructions; a bus; a memory unit coupled with said bus; a processor coupled with said bus, said processor for executing a computer implemented method for providing an investment portfolio further comprising the following steps in any order: determining a percentage guarantee based on a guaranteed principal portion of a total investment amount, relating the percentage guarantee to a degree of risk, determining an investor risk profile based on the degree of risk and the guaranteed principal, displaying the investor profile, selecting one or more guaranteed sum certain principal investment portions correlating to the investor profile, and selecting one or more non-guaranteed investment portions based on the investor profile, wherein the investment portfolio returns an amount based on the degree of risk, said amount comprising a first portion of a guaranteed sum certain principal and a second portion of a non-guaranteed investment return.

In yet another embodiment, a computer system for providing at least one non-guaranteed principal portion wherein a guaranteed principal portion coupled with said non-guaranteed principal portion provide an enhanced market return on a principal investment amount and said enhanced market return comprising at least a guaranteed sum certain principal amount, said computer system comprising a data storage medium for storing instructions; a bus; a memory unit coupled with said bus; a processor coupled with said bus, said processor for executing a computer implemented method for providing an investment portfolio wherein the guaranteed sum certain principal investment comprises one or more annuities.

In another embodiment, a computer system for providing at least one non-guaranteed principal portion wherein a guaranteed principal portion coupled with said non-guaranteed principal portion provide an enhanced market return on a principal investment amount and said enhanced market return comprising at least a guaranteed sum certain principal amount, said computer system comprising a data storage medium for storing instructions; a bus; a memory unit coupled with said bus; a processor coupled with said bus, said processor for executing a computer implemented method for providing an investment portfolio wherein the non-guaranteed principal portion is a mutual fund, an exchange traded fund, an individual stock, a commodity or stock option.

In another embodiment, a computer system for providing an investment portfolio, comprising a data storage medium for storing instructions; a bus; a memory unit coupled with said bus; a processor coupled with said bus, said processor for executing a computer implemented method for providing an investment portfolio comprising: selecting at least one non-guaranteed investment, selecting at least one sum certain guaranteed principal initial investment amount, selecting a degree of investment risk, selecting a guaranteed sum certain principal percentage, selecting at least one initial investment amount, providing a market rate of return amount, and providing a sum certain principal return amount.

In another embodiment, a computer-usable medium having computer-readable program code embodied therein for controlling a processor for executing a method for providing an investment portfolio comprising: selecting at least one non-guaranteed investment, selecting at least one guaranteed sum certain principal initial investment mount, selecting a degree of investment risk, selecting a guaranteed sum certain principal percentage, selecting at least one initial investment amount, providing a market rate of return amount, and providing a guaranteed sum certain principal return amount.

In yet another embodiment, a computer-usable medium having computer-readable program code embodied therein for controlling a processor for executing a method for providing an investment portfolio further comprising the following steps in any order: determining a percentage guarantee based on a guaranteed principal portion of a total investment amount, relating the percentage guarantee to a degree of rik, determining an investor risk profile based on the degree of risk and the guaranteed principal, displaying the investor profile, selecting one or more guaranteed sum certain principal investment portions correlating to the investor profile, and selecting one or more non-guaranteed investment portions based on the investor profile, wherein the investment portfolio returns an amount based on the degree of risk, said amount comprising a first portion of a guaranteed sum certain principal and a second portion of a non-guaranteed investment return.

In another embodiment, a computer-usable medium having computer-readable program code embodied therein for controlling a processor for executing a method for providing an investment portfolio wherein the guaranteed sum certain principal investment comprises one or more annuities.

In another embodiment, a computer-usable medium having computer-readable program code embodied therein for controlling a processor for executing a method for providing an investment portfolio wherein the non-guaranteed principal portion is a mutual fund, an exchange traded fund, an individual stock, a commodity or stock option.

In another embodiment, a computer-usable medium for executing a method for providing an investment portfolio comprising: program code for selecting at least one non-guaranteed investment, program code for selecting at least one guaranteed sum certain principal initial investment amount, program code for selecting a degree of investment risk, program code for selecting a guaranteed sum certain principal percentage, program code for selecting at least one initial investment amount, program code for providing a market rate of return amount, and program code for providing a guaranteed sum certain principal return amount.

In another embodiment, a computer-usable medium for executing a method for providing an investment portfolio further comprising the following steps in any order: program code determining a percentage guarantee based on a guaranteed principal portion of a total investment amount, program code relating the percentage guarantee to a degree of risk, program code determining an investor risk profile based on the degree of risk and the guaranteed principal, program code displaying the investor profile, program code selecting one or more guaranteed sum certain principal investment portions correlating to the investor profile, and program code selecting one or more non-guaranteed principal portions based on the investor profile, wherein the investment portfolio returns an amount based on the degree of risk said amount comprising a first portion of a guaranteed sum certain principal and a second portion of a non-guaranteed investment return.

In another embodiment, a computer-usable medium for executing a method for providing an investment portfolio wherein the guaranteed sum certain principal investment comprises one or more annuities.

In another embodiment, a computer-usable medium for executing a method for providing an investment portfolio wherein the non-guaranteed principal portion is a mutual fund, an exchange traded fund, an individual stock, a commodity or stock option.

In yet another embodiment, a computer-implemented apparatus for providing an investment portfolios, said apparatus comprising of: a processor, an input device coupled to said processor, a memory coupled to said processor, an execution engine including a method for providing an investment portfolio executable by said processor, and an output device.

In an additional computer system embodiment, a relational database management system (RDBMS) comprises a relational data repository storing investment fact data; an aggregation module, operatively coupled to the relational data store comprising one or more investment portfolio products, one or more target risk profiles, at least one non-guaranteed principal portion per investment portfolio product and at least one guaranteed principal portion per investment portfolio product; a query servicing module, operatively coupled to the aggregation module, for servicing query statements generated in response to user input, said query servicing mechanism comprising: a reference generating module for generating a user-defined relationship between a plurality of investment portfolio products and a plurality of target risk profiles to aggregated investment fact data generated by the aggregation module; and a query processing module for processing a given investment query command, wherein upon identifying that the given investment query command is related to said user-defined relationship, communicates with said aggregation module over an interface therebetween to retrieve portions of aggregated investment fact data pointed to by said reference that are relevant to said given investment query statement.

In a further additional embodiment a method is implemented with one or more processor readable storage devices having processor readable code embodied on at least one processor readable storage device, said processor readable code for programming at least one processor to perform a method of providing an investment portfolio comprising the following steps in various order: providing a menu to a user in a machine readable markup language; receiving one or more requests from the user for financial information related to said user's portfolio and investment goals; fetching said financial information from a database; formatting the financial information into hypertext markup language, and; transmitting the hypertext markup language to the user wherein the financial information comprises one or more aggregated database objects including one or more target risk profiles, one or more investor profiles, at least one non-guaranteed principal portions, and at least one sum certain guaranteed principal portions.

In a further additional embodiment, a computer system provides at least one non-guaranteed principal portion wherein a guaranteed principal portion coupled with said non-guaranteed principal portion provide an enhanced market return on a principal investment amount and said enhanced market return comprising at least a guaranteed sum certain principal amount, said computer system comprising a data storage medium for storing instructions; a bus; a memory unit coupled with said bus; a processor coupled with said bus, said processor for executing a computer implemented method for providing an investment portfolio comprising: electronically associating, by the computer system, a relational database management software system server to a client interface; embedding an input/output module in the client interface; aggregating, by the computer system, one or more database objects in an investor profile table, including arrangements for comparing the one or more database objects to calculate one or more investor profile ratios; selecting, by the computer system, at least one non-guaranteed investment; selecting, by the computer system, at least one guaranteed sum certain principal initial investment amount; selecting, by the computer system, a degree of investment risk; selecting, by the computer system, a guaranteed sum certain principal percentage; selecting, by the computer system, at least one initial investment amount; providing, by the computer system, a market rate of return amount; providing, by the computer system, a guaranteed sum certain principal return amount; and displaying said one or more database objects.

In a yet additional further embodiment, a computer system for providing an investment portfolio, comprises a data storage medium for storing instructions; a bus; a memory unit coupled with said bus; a processor coupled with said bus, said processor for executing a computer implemented method for providing an investment portfolio comprising: selecting, by the computer system, at least one non-guaranteed investment; selecting, by the computer system, at least one sum certain guaranteed principal initial investment amount; selecting, by the computer system, a degree of investment risk; and selecting, by the computer system, a guaranteed sum certain principal percentage, selecting, by the computer system, at least one initial investment amount; providing, by the computer system, a market rate of return amount; and providing, by the computer system, a sum certain principal return amount, said sum certain principal.

In an additional further embodiment, a computer-usable medium having computer-readable program code embodied therein for controlling a processor for executing a method for providing an investment portfolio comprises: program code for selecting at least one non-guaranteed investment; program code for selecting at least one guaranteed sum certain principal initial investment amount; program code for selecting a degree of investment risk; program code for selecting a guaranteed sum certain principal percentage; program code for selecting at least one initial investment amount; program code for providing a market rate of return amount; and program code for providing a guaranteed sum certain principal return amount.

In a yet additional further embodiment, a computer-implemented apparatus for providing an investment portfolio, said apparatus comprises a processor; an input device coupled to said processor; a memory coupled to said processor; an execution engine including a method for providing a guaranteed principal investment system executable by said processor; and an output device.

In an additional computer systems embodiment, a data processing system for providing an investment system, comprises an engine for processing data; a storage module for storing data on a storage medium wherein said storage means contains a relational database having investment fact tables, dimension investment tables and metadata describing the relationships between the investment fact and dimension tables; a module initializing the storage medium; an engine for processing data in an investment portfolio; a module for selecting at least one non-guaranteed investment; a module for selecting at least one guaranteed sum certain principal initial investment amount; a module for selecting a degree of investment risk; a module for selecting a guaranteed sum certain principal percentage; a module for selecting at least one initial investment amount; a module for providing a market rate of return amount; and a module providing a guaranteed sum certain principal amount, said guaranteed sum certain principal amount being less than the total initial investment amount.

In an additional embodiment, a customizable application system comprises an investment application execution system configured to support a sum certain guaranteed principal investment calculation system; a user interface generator operable to generate an investment application user interface including an investor interface element, the investment application user interface being configured for delivery to the investment client over a computer network, the investment interface element including a find command; metadata characterizing the one or more investor profile table objects to create the one or more investor profile ratios calculate command; a relational data store including an investment data record further characterizing the find command, the investment data record being user modifiable in response to receiving input from an investment user defining a property for the user customizable find command and being accessible using the metadata, the property specifying the scope of the investment data to search, wherein the investment application user interface is automatically generated in response to a request from the investment client and configured with the property for the one or more investor profile table objects to create the one or more investor profile ratios calculate command, wherein the investment user interface is operable to display an amount of data in response to the previously executed query, and wherein the one or more investor profile table objects to create the one or more investor profile ratios calculate command is operable to execute a search within the scope of investment data with respect to the results of the previous executed query, said executed search including steps of: displaying said subset query results in said investment application user interface operating said single instance of an investment application user interface independently from a database server, and providing said database server independently from the number of query operations required to retrieve a requested query result to allow an investment user to include configuration data and personalization data in said generated investment application user interface without modification of the user interface design developed in page development.

In an additional embodiment, a computer readable medium including an internet application, the internet application comprises metadata defining an investment application user interface, the investment application user interface including a user interface element with a user customizable calculate investment profile command, the investment application user interface configured for delivery to an investment client and configured to operate as an interface between an investment user and the internet application, the investment user customizable calculate investment profile command being customizable with respect to a scope of a search, the scope of the search being customizable to include one of all results of a previously executed query, a subset of the results of the previously executed query, and only the results of the previously executed query that are displayed in the investment application user interface; an investment user interface generator configured to generate the investment application user interface in response to a request from the investment user using a user modifiable investment data record stored in a location physically remote from the client, the user modifiable investment data record configurable to characterize the user customizable calculate investment profile command; and a configuration system configured to receive an input from an investment user to modify the user modifiable data record with a property for the calculate investment profile command, the property specifying the scope of the search, wherein the investment application user interface is automatically generated and configured with the property for the calculate investment profile command, wherein the investment user interface is operable to display an amount of investment data in response to the previously executed query, and wherein the calculate investment profile command is operable to execute a search within the scope of search with respect to the results of the previously executed query, independently from a database server, said database server independent from the type of data stored in the database server and the number of query operations required to retrieve a requested query result allowing an investment user to include configuration data and personalization data in the generated investment application user interface without modification of the user interface design developed in page development.

In an additional embodiment, an application execution system comprises an Internet application module; a module for generating an investment application user interface using a user modifiable data record configured to store investment data characterizing a user customizable calculate investor profile command search in response to receiving input from an investment user defining a property for the user customizable calculate investor profile command, wherein the investment application user interface is automatically generated and configured with the property for the calculate investor profile command, the user customizable interface comprising the calculate investor profile command being customizable with respect to a scope of a search, the scope of the search based on the property received and customizable to include one of all results of a previously executed query, a subset of the results of the previously executed query, and only the results of the previously executed query that are displayed in the investment application user interface; and a module for providing the investment application user interface to an investment user, the investment application user interface including a user interface element, the investment application user interface configured as an interface between the internet application and the investment user, the user interface element including the user customizable calculate investor profile command, the user interface element configured for delivery to a client over a computer network, wherein the investment application user interface is operable to display an amount of investment data in response to the previously executed query, and wherein the calculate investor profile command is operable to execute a search within the scope of search with respect to the results of the previously executed query, operating said single instance of an investment application user interface independently from a database server, said database server independent from the number of query operations required to retrieve a requested query result and independent from the type of data stored in the database server, allowing an investment user to include configuration data and personalization data in the generated application user interface without modification of the user interface design developed in page development.

In an additional embodiment, a computer readable medium for a computer system comprises a bus; a memory unit coupled with said bus; a thin client, a server comprising an application server and a database server, a data repository, a processor coupled with said bus, said processor for executing a method for providing methods and products providing a guaranteed principal amount: program code for accessing said data repository, said data repository further comprising a relational database wherein said relational database contains investment fact data; program code for partitioning a portion of said data repository into a first group and a second group of memory stored investment data strings; program code for partitioning a portion of said investment data strings into said first group of memory stored investment data strings, said partitioning into said first group based on a variable byte-width property of said monitoring and management data strings; program code for partitioning a portion of said investment data strings into said second group of memory stored investment data strings, said partitioning into said second group based on a variable byte-width property of said monitoring and management data strings; program code for searching through said first group of memory stored investment data strings for a prescribed string utilizing a fixed byte-width data string process; program code for searching through said second group of memory stored investment data strings for a prescribed string utilizing a variable byte-width data string process, wherein the execution of said fixed byte-width investment data string process is more efficient than the execution of said variable byte-width investment data string process to implement various steps to implement financial services that may be provided and included in various forms of computer readable media utilizing a computer implemented method for providing an investment portfolio; and program code for providing computer readable media to receive data from one or more external peripheral devices that are specially designed to be coupled with one or more guaranteed principal investment programs.

In an additional embodiment, a computer implemented investor interface system includes an Internet application, a computer readable storage medium, a computer program executable instruction, recorded on the computer readable storage medium and a processor for performing steps, the steps comprising: providing a user interface element on a single instance of an application user interface to display data results in response to a previously executed query, independently from a database server and independent from the number of query operations required to retrieve a requested query result and independent from the type of data stored in the database server, allowing an investor user to include configuration data and personalization data in the generated application user interface without modification of the user interface design developed in page development; allowing an investor end user to select from a plurality of investment portfolio products wherein said plurality of investment portfolio products are coupled to a plurality of investment query results and independent from the investment data type stored in the database server allowing an investor user to include configuration data and personalisation data in the generated application user interface without modification of the user interface design developed in page development; configuring a user modifiable data record in response to a request from said investor end user; and providing a calculate investor profile command operable to search a subset including only the results of the previously executed query.

The construction and method of operation of the invention, together with additional objectives and advantages thereof, will be best understood from the following description of specific embodiments when read in connection with the accompanying drawings.

DETAILED DESCRIPTION

Figure 1:
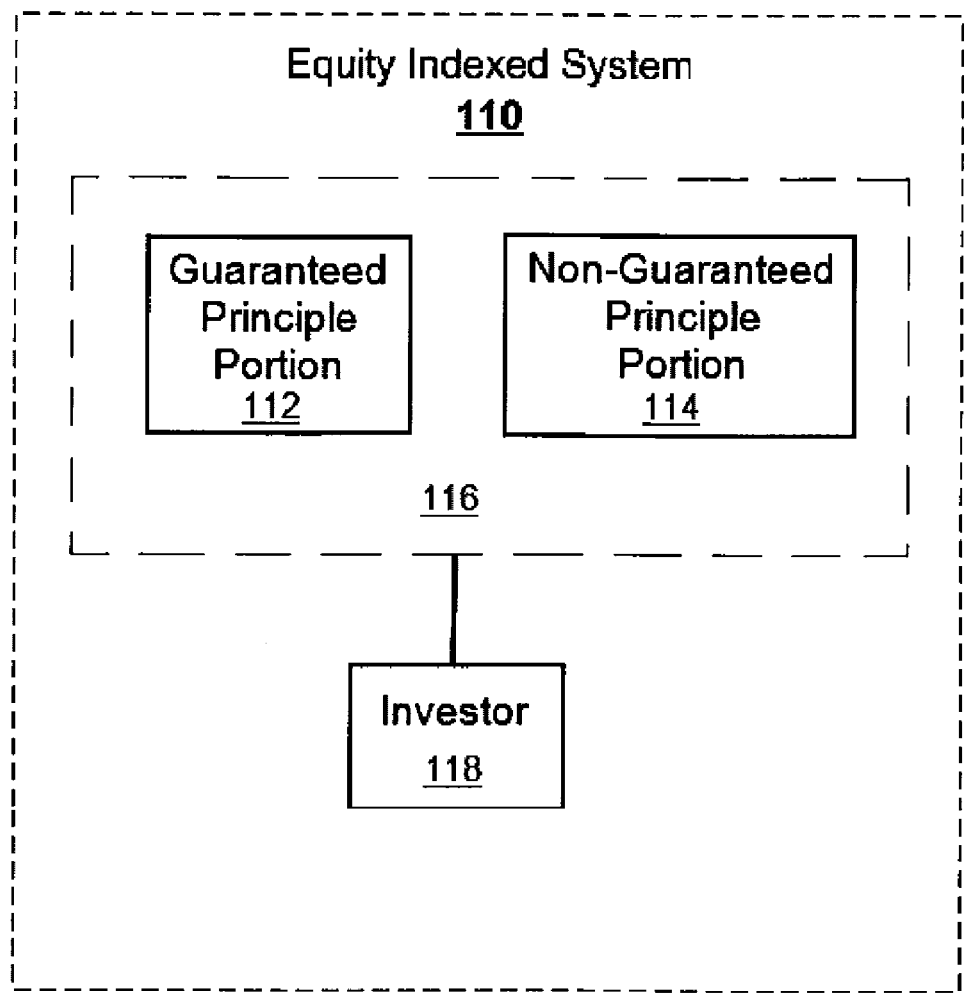
FIG. 1 is a high level block diagram of one embodiment of the guaranteed principal investment system of the current invention.

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

References in the specification to "one embodiment", "an embodiment", "an example embodiment", etc., indicate that the embodiment described may include a particular feature, structure or characteristic, but every embodiment may not necessarily include the particular feature, structure or characteristic. Moreover, such phrases are not necessarily referring to the same embodiment. Further, when a particular feature, structure or characteristic is described in connection with an embodiment, it is submitted that it is within the knowledge of one of ordinary skill in the art to effect such feature, structure or characteristic in connection with other embodiments whether or not explicitly described. Parts of the description are presented using terminology commonly employed by those of ordinary skill in the art to convey the substance of their work to others of ordinary skill in the art.

Investment firms and insurance companies often package investment instruments in differing combinations to provide easy to understand investment products to their clients. The investment products provide differing levels of risk and reward and are presented to clients based on their investment needs and risk tolerance. For example, as people retire they are more risk adverse and prefer investments which are more secure, such as annuities, instead of higher risk investments such as equities. The investment products are generally sold as part of a contract between the investor and a broker or insurance company. The contract sets terms and conditions required for the investment products.

FIG. 1 is a high level block diagram of one embodiment of the guaranteed principal investment system of the current invention 110. The equity index system 110 is comprised of one or more investment portfolios 116 and one or more investors 118. The investment portfolio 116 is further comprised of a guaranteed principal portion 112 and a non-guaranteed principal portion 114. The guaranteed principal portion 112 provides for a minimum amount of investment principal that is guaranteed to be returned to the investor. The guaranteed principal amount may be selected by an investor and sets the minimum amount of principal the investment maintains. In this embodiment the guaranteed principal portion 112 is comprised of a contract with an investment firm or insurance company wherein the contract provider guarantees the principal amount. Such a portfolio may be based on at least one annuity, savings bond or other form of investment that provides a guaranteed principal. In this embodiment the guaranteed performance provides for a sum certain principal amount.

The non-guaranteed principal portion 114 is an investment portfolio comprised of equities and other investments that do not provide a guaranteed principal. These are one or more stocks, bonds or other investment instruments not supported by a contract to provide a guaranteed amount. Together, the guaranteed principal portion 112 and the non-guaranteed principal portion 114 provide an investment portfolio 116 that provides a return to the investor 118 such that an investor 118 gains the benefit of a predetermined fixed guaranteed principal to protect against principal losses and the benefit of equity market performance in a single investment instrument.

The guaranteed principal portion 112 is comprised of one or more annuities or other investments where at least a portion of the investment is assured to be returned to the investor. These annuities may be from a single annuity contract with an insurer or from a collection of multiple annuities from differing sources. Also the differing annuities may be tax exempt annuities or combinations of tax exempt and non tax-exempt annuities. The annuities may be held in tax deferred accounts such as individual retirement accounts (IRAs) or non tax deferred accounts or any combination thereof. Also the differing investments may be tax deferred annuities or combinations of tax deferred and non tax deferred investments choices.

The non-guaranteed principal portion 114 is comprised of one or more non-guaranteed investment instruments such as mutual funds, exchange traded funds, individual stocks, commodities, options and other instruments suitable to the investor. The non-guaranteed principal portion 114 may also contain equity indexed annuities or combinations of equity indexed annuities and non-guaranteed investment instruments. The non-guaranteed principal portion 114 may be comprised of tax deferred instruments and may be held in tax deferred accounts such as individual retirement accounts (IRAs) or non tax deferred accounts or any combination thereof.

A non-guaranteed investment instrument is any investment where a minimum return on the investment is not assured. Although stocks and mutual funds are presented here, one having skill in the art would recognize that other, more varied investments may be employed in keeping with the spirit of the present invention. Likewise other investments besides annuities may provide a guaranteed principal to the investor.

The investor 118 selects an investment portfolio based on the investor's 188 risk tolerance. It is within the scope and spirit of the current invention to prepackage differing guaranteed principal portions 112 and non-guaranteed principal portion 114 to meet the requirements of differing investors. For example, an investment instrument 116 may be comprised of a guaranteed principal portion 112 that is one or more annuities and a non-guaranteed principal portion 114 that is comprised of one or more "blue chip" stocks. This would provide and investment instrument 116 that is preferable for people who are risk adverse. As another example the investment instrument 116 may be comprised of a guaranteed principal portion 112 that is one or more indexed based annuities and a non-guaranteed principal portion 114 that is comprised of one or more technology stocks. This would provide and investment instrument 116 that is preferable for people who are willing to take more risk. The current invention provides for packaging differing investments together and providing to investors differing investment instruments to meet investor 118 risk profiles. In addition to packaging differing investments together, the current invention may be customized on a per investor 118 basis.

Figure 2:
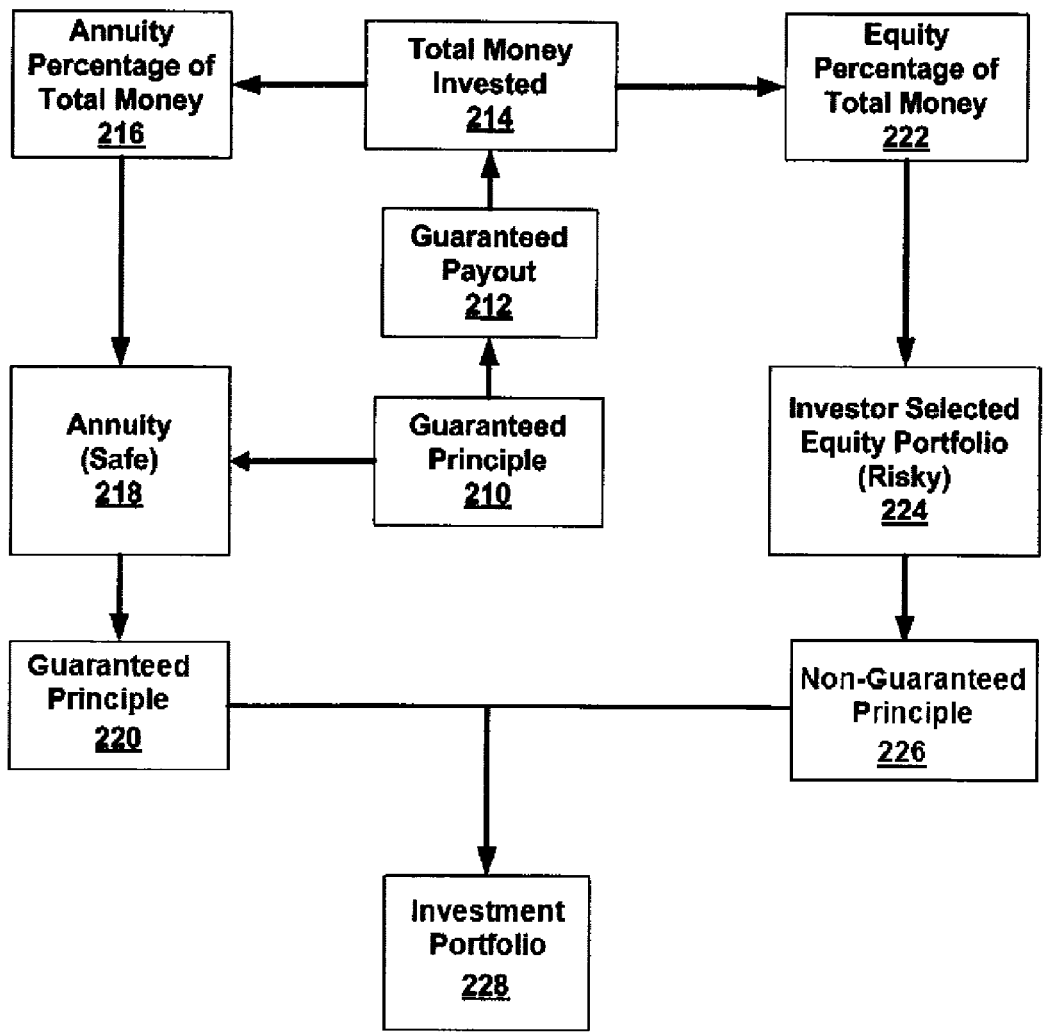
FIG. 2 is an exemplary block diagram illustrating the management of the guaranteed principal investment system of the present invention.

FIG. 2 is an exemplary block diagram illustrating one embodiment of the guaranteed principal investment system 110 of the present invention. The first step is to determine the guaranteed principal 210 which may be specified by an investor or predetermined as part of a standard investment product. Next the guaranteed payout 212 and total money invested 214 is established. The total money invested 214 is split into two portions. A first portion, usually expressed as a percentage, of total money 216 is directed towards annuities 218 while a second portion 222 is directed to an investor selected equity portfolio 224. The income produced by the annuity 218 provides a guaranteed principal portion 220 which is combined with the non-guaranteed portion 226 from the investor selected equity portfolio 224 to produce an investment portfolio 228.

One having skill in the art will recognize that the operations described above may be investor selected or predetermined by the contract offeror. Additionally, combinations of investor selected or predetermined operations may be created that maintain the spirit of the current invention. Also the investor may at times reallocate the percentage of total money invested 214 into differing portions of annuity percentage 216 and equity percentage 222 investments. Finally, although this embodiment shows an annuity for generating a guaranteed principal amount, the invention may practiced using other guaranteed principal contracts besides an annuity.

The benefit of this embodiment of the present invention is that an investor may gain the advantages of a guaranteed principal amount combined with the advantage of a variable rate of return investment instrument. Another advantage is that as market conditions change, the percentage of money in high risk investments may be reallocated to lower risk investments and vice versa. A third advantage is that the investor may allocate money or portions of money into or out of tax deductible investment instruments thus tailoring an investment based on an investor's financial needs. The wide variety of taxable, tax deferred, principal guarantee and tax free investments provides a unique choice for the investor in a manner much easier than previous investment systems.

Figure 3:
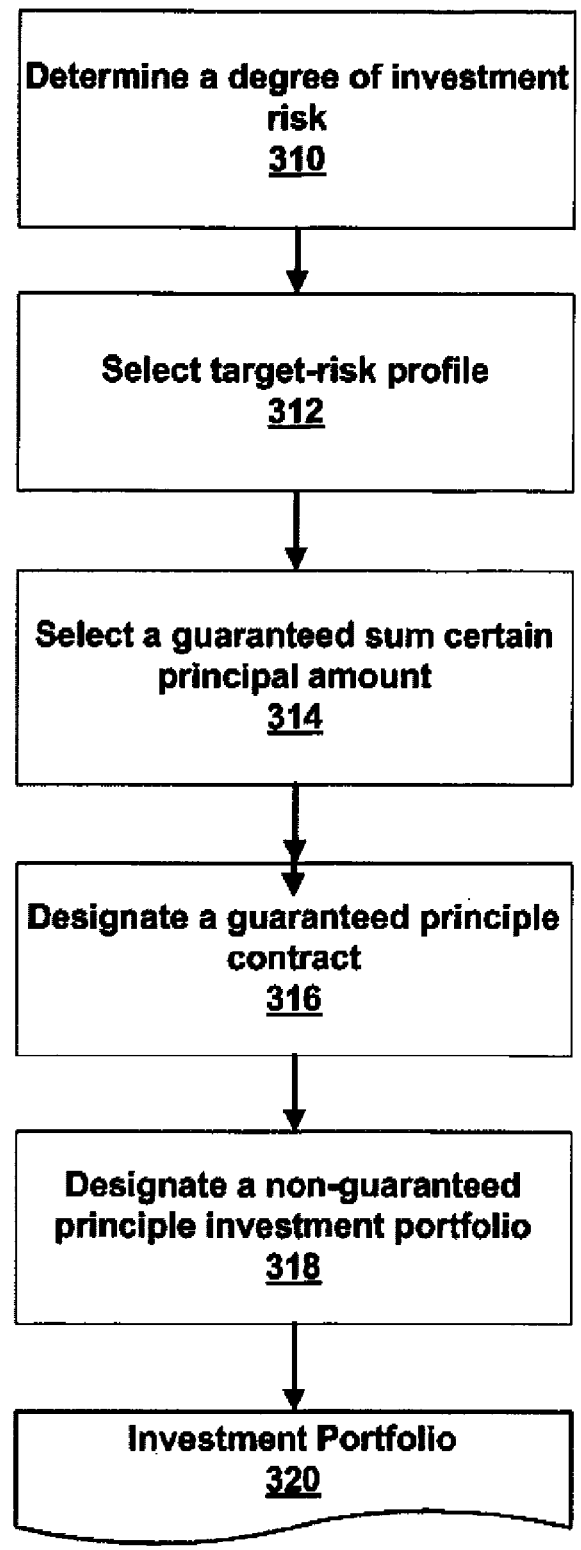
FIG. 3 shows a flowchart detailing the steps necessary to effect one embodiment of the current invention.

FIG. 3 shows a flowchart detailing the steps necessary to effect one embodiment of the current invention. Although the flowchart of FIG. 3 shows one series of steps, the steps may be performed in any order. The first step comprises determining a degree of investment risk 310 based on investor preferences. A high degree of investment risk would place a substantial portion of the total investment in high risk, but high yield, investment instruments. Secondly selecting a target-risk profile 312 comprised of differing prepackaged investment instruments wherein certain investments are combined to meet the needs of the investor based on investment risk. A guaranteed sum certain principal percentage 314 is selected which provides for a predetermined amount which the investment contract must pay as a percentage of a principal amount. Once the degree of risk is established, a guaranteed principal contract 316 and a non-guaranteed investment instrument 318 are established.

The method of FIG. 3 results in a portfolio that provides return to the investor comprising a first portion which is a sum certain principal amount of less than an initial investment, and a second portion which is based on a market rate of return from the target-risk profile. The portfolio may also provide for a degree of investment risk and a desired contract holding period so that regular income payments can be made to an investor.

Figure 4:
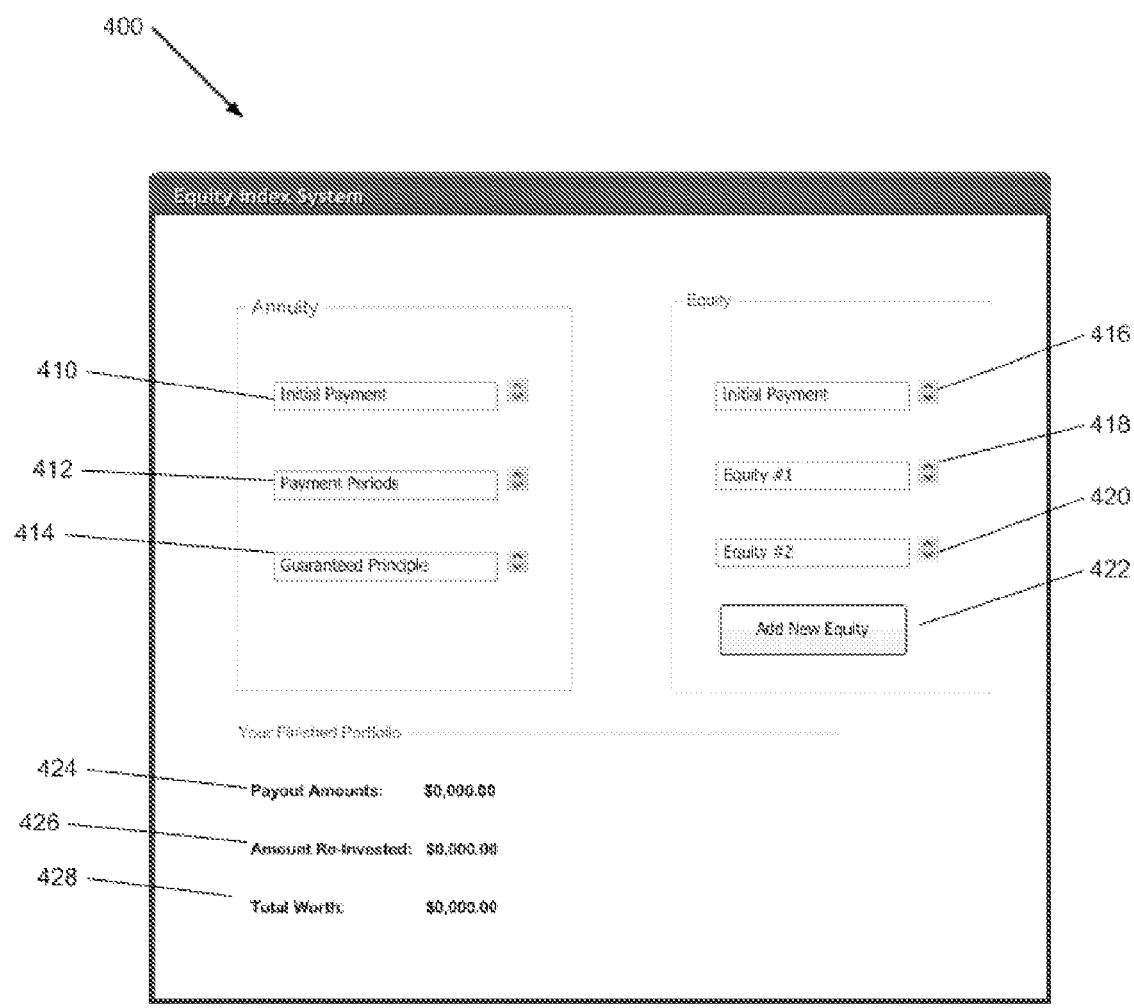
FIG. 4 depicts one possible user interface for a computer-based system for implementing one embodiment of the current invention.

FIG. 4 depicts one possible user interface 400 for a computer-based system for implementing one embodiment of the current invention. This embodiment comprises an annuity information screen area 430 for entering annuity information, an equity information screen area 432 for selecting equities and a finished portfolio display screen area for displaying the results of the portfolio. In this embodiment the guaranteed principal portion is based on an annuity; however it could be implemented using other guaranteed principal contracts. In the annuity screen area 430 an initial payment 410 is entered along with the desired payment periods 412 and a guaranteed principal 414. Under the equity screen area 432 an initial payment 416 is entered along with a list of equities. For example equity #1 418 and equity #2 420. The Add New Equity button 422 allows a user to add more equities to the equity screen area 432. Once the annuity and equity screen area are completed, payout amounts 424, amount re-invested 426 and total worth 428 are displayed in a finished portfolio screen area 434. The payout amounts 424, amount reinvested 426 and total worth 428 may be calculated based on the earnings of the total investment over the lifetime of the investment.

The user interface of FIG. 4 may allow the user to change certain settings during the lifetime of the investment. For example, if the investment provides earnings, those earning can be directed towards new or differing investment options. New equities could be added to the system or a different guaranteed principal could be specified. Additionally, the user interface may be constructed to provide for allocating funds between tax exempt and non tax exempt investments (not shown).

Certain reset features might be included to change the sum certain guaranteed principal target risk profile and other settings based on the earnings of the system (not shown). The reset functions could be implemented annually, monthly or at other intervals as desired thus providing a means for an investor to gain from market advances or to reduce risk in poor performing markets.

The user interface of FIG. 4 may include optional control (not shown) for specifying the degree of risk. The degree of risk, together with the guaranteed principal amount 424, indicates an investor risk profile that characterizes the investor's risk adversity. The investor risk profile may be used to limit the available investment selections to instruments consistent with the investor risk profile. For example a highly risk adverse investor may only be able to choose investments' from more conservative investment options.

The user interface of FIG. 4 may be implemented on a personal computer (PC) or on a computer connected as a network server. One having skill in the art would recognize that the current invention may be implemented using standard software including but not limited to Java, HTML, C, Visual Basic and other programming languages. One having skill in the art would also recognize that the software may be implemented using algorithms, routines and procedures known in the art for effecting financial service computer code. The software may be encoded or otherwise embodied on processor readable storage devices such as hard drives and memory modules for operating a computer or other electronic device.

Input and display of the current invention may be implemented on common displays and keyboards, personal digital assistants (PDAs), mobile communications devices and other electronic hardware with input and display capabilities. Additionally displays of amounts, portfolios and/or profiles include graphs and charts as well as computer generated reports for printing and/or publishing.

In another embodiment, a method is disclosed that provides an investment system that allocates a pre-determined amount of investment dollars into a unique equity driven market return portfolio, and provides an end user investor of said equity driven market return portfolio the choice to pre-determine an amount of investment to be principal guaranteed using the flexible interest choices.

In yet another aspect of the invention, provided in the index annuity portion of said method, the portfolio may provide 100% market driven returns to investor with a flexible interest feature of the index annuity combined with various equity choices without a guarantee of principal. This feature to guarantee principal and receive a flexible interest return is demonstrated by a formula that is driven by equity market performance.

The guarantee of principal provided with said method is unique to equity based portfolio design. Using this method of principal guarantee to reduce the risk of loss inherent in equity investments, the reduced volatility may reduce deviation to the portfolio and increase the predictability of returns. With market driven returns provided from the unique feature of index flexible interest, the remaining portion of investment may be apportioned into equity and or debt investment choices providing conventional non-guaranteed principal returns. The reduced risk feature of method may provide institutional programs the stability needed to forecast future funding obligations.

Figure 5:
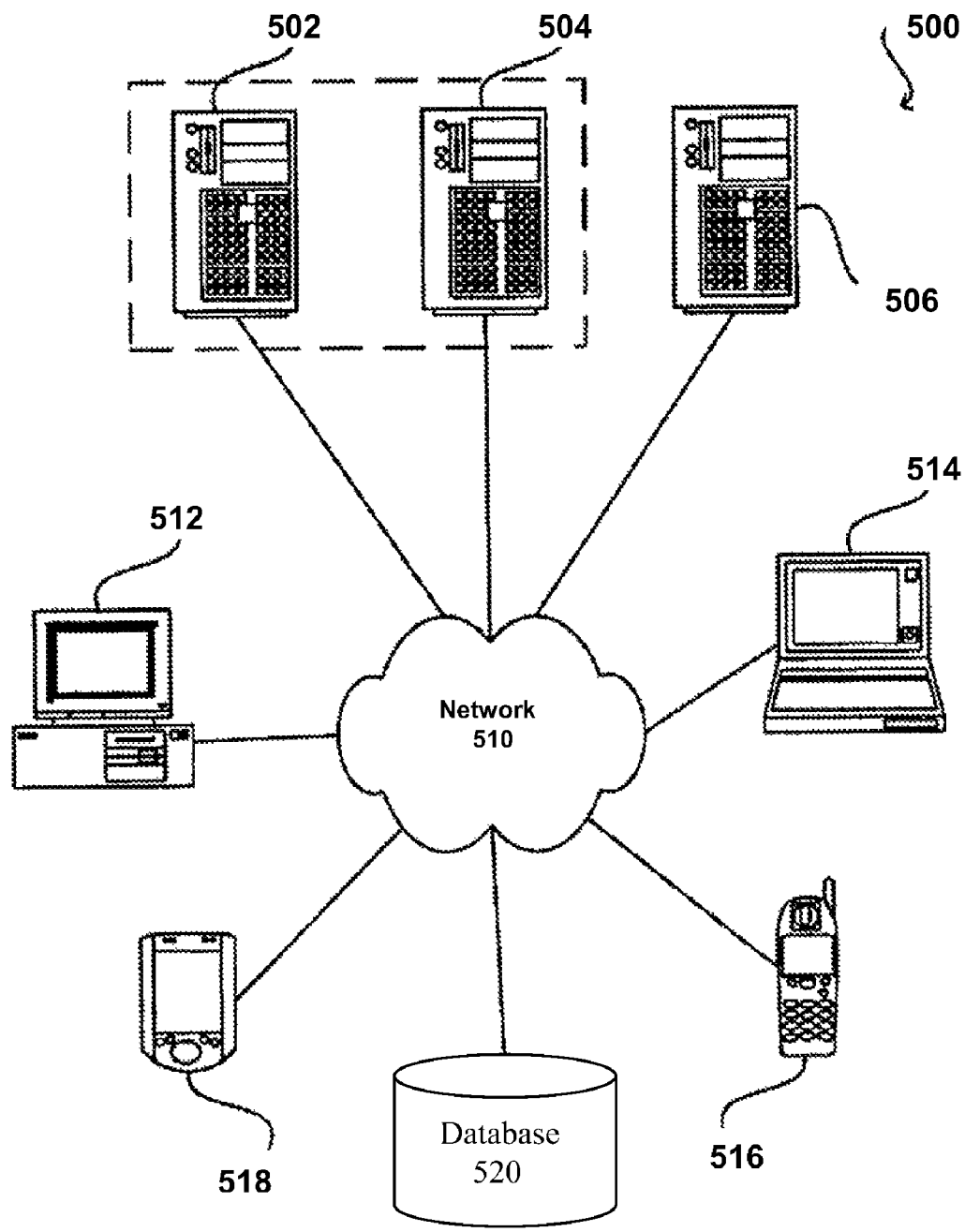
FIG. 5 is a block diagram illustrating components of an exemplary operating environment in which various embodiments of the present invention may be implemented.

Exemplary Operating Environments, Components and Technology. FIG. 5 is a block diagram illustrating components of an exemplary operating environment in which various embodiments of the present invention may be implemented. The system 500 can include one or more user computers, computing devices, or processing devices 512, 514, 516, 518, which can be used to operate a client, such as a dedicated application, web browser, etc. The user computers 512, 514, 516, 518 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 512, 514, 516, 518 may also have any of a variety of applications, including one or more development systems, database client and/or server applications, and Web browser applications. Alternatively, the user computers 512, 514, 516, 518 may be any other electronic device, such as a thin-client computer, Internet-enabled gaming system, and/or personal messaging device, capable of communicating via a network (e.g., the network 510 described below) and/or displaying and navigating Web pages or other types of electronic documents. Although the exemplary system 500 is shown with four user computers, any number of user computers may be supported.

In most embodiments, the system 500 includes some type of network 510. The network may can be any type of network familiar to those skilled in the art that can support data communications using any of a variety of commercially-available protocols, including without limitation TCP/IP, SNA, IPX, AppleTalk, and the like. Merely by way of example, the network 510 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 502, 504, 506 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 506) may be dedicated to running applications, such as a business application, a Web server, application server, etc. Such servers may be used to process requests from user computers 512, 514, 516, 518. The applications can also include any number of applications for controlling access to resources of the servers 502, 504, 506.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 512, 514, 516, 518. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 512, 514, 516, 518.

The system 500 may also include one or more databases 520. The database(s) 520 may reside in a variety of locations. By way of example, a database 520 may reside on a storage medium local to (and/or resident in) one or more of the computers 502, 504, 506, 512, 514, 516, 518. Alternatively, it may be remote from any or all of the computers 502, 504, 506, 512, 514, 516, 518, and/or in communication (e.g., via the network 510) with one or more of these. In a particular set of embodiments, the database 520 may reside in a storage-area network ("SAN") familiar to those skilled in the art. Similarly, any necessary files for performing the functions attributed to the computers 502, 504, 506, 512, 514, 516, 518 may be stored locally on the respective computer and/or remotely, as appropriate. In one set of embodiments, the database 520 may be a relational database, such as Oracle 10g, that is adapted to store, update, and retrieve data in response to SQL-formatted commands.

Figure 6:
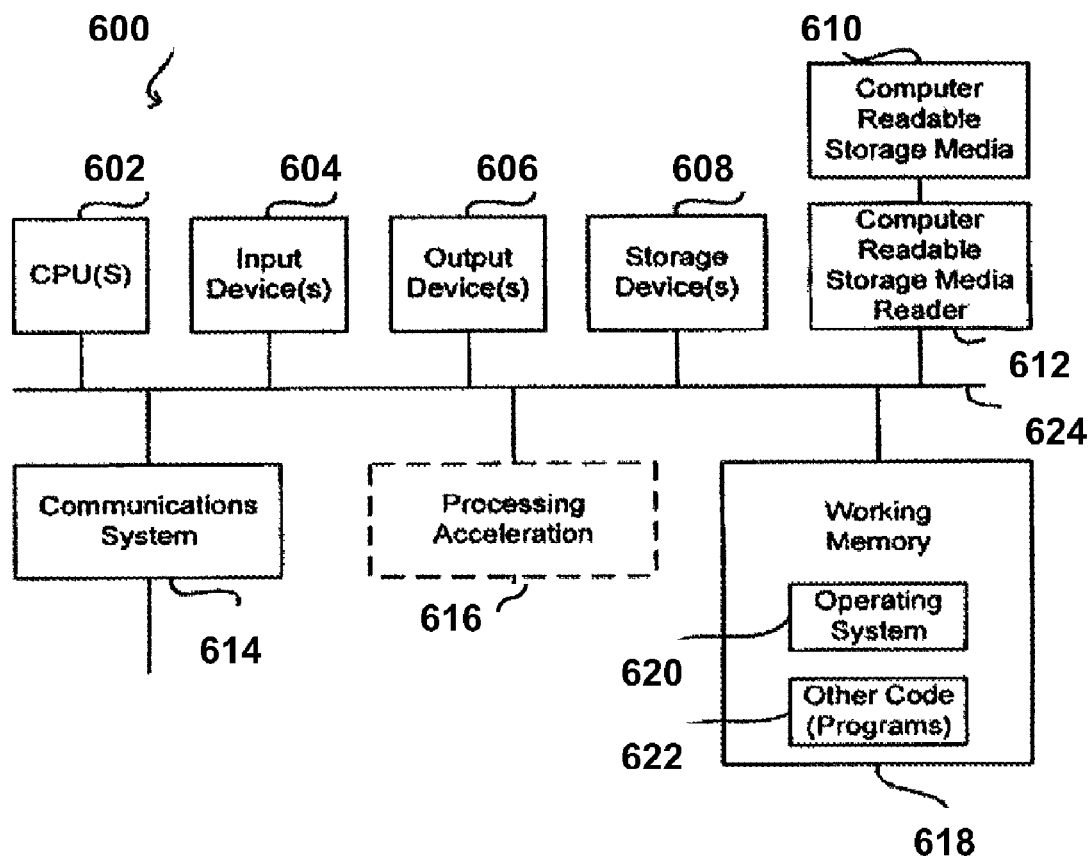
FIG. 6 is a block diagram illustrating an exemplary computer system in which various embodiments of the present invention may be implemented.

FIG. 6 illustrates an exemplary computer system 600, in which various embodiments of the present invention may be implemented. The system 600 may be used to implement any of the computer systems described above. The computer system 600 is shown comprising hardware elements that may be electrically coupled via a bus 624. The hardware elements may include one or more central processing units (CPUs) 602, one or more input devices 604 (e.g., a mouse, a keyboard, etc.), and one or more output devices 606 (e.g., a display device, a printer, etc.). The computer system 600 may also include one or more storage devices 608. By way of example, the storage device(s) 608 can include devices such as disk drives, optical storage devices, solid-state storage device such as a random access memory ("RAM") and/or a read-only memory ("ROM"), which can be programmable, flash-updateable and/or the like.

The computer system 600 may additionally include a computer-readable storage media reader 612, a communications system 614 (e.g., a modem, a network card (wireless or wired), an infra-red communication device, etc.), and working memory 618, which may include RAM and ROM devices as described above. In some embodiments, the computer system 600 may also include a processing acceleration unit 616, which can include a digital signal processor DSP, a special-purpose processor, and/or the like.

The computer-readable storage media reader 612 can further be connected to a computer-readable storage medium 610, together (and, optionally, in combination with storage device(s) 608) comprehensively representing remote, local, fixed, and/or removable storage devices plus storage media for temporarily and/or more permanently containing, storing, transmitting, and retrieving computer-readable information. The communications system 614 may permit data to be exchanged with the network and/or any other computer described above with respect to the system 600.

The computer system 600 may also comprise software elements, shown as being currently located within a working memory 618, including an operating system 620 and/or other code 622, such as an application program (which may be a client application, Web browser, mid-tier application, RDBMS, etc.). It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate.

Figure 7:
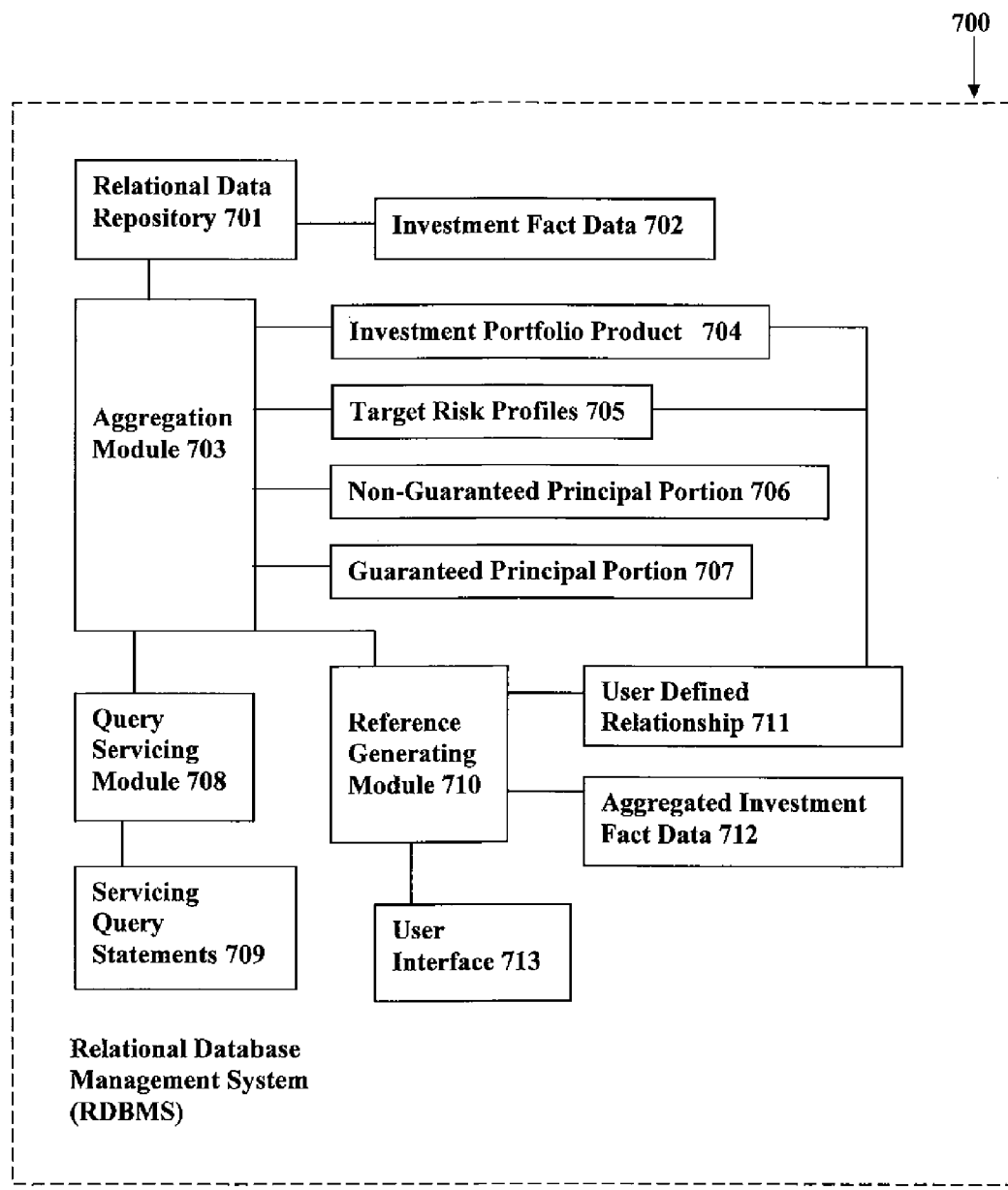
FIG. 7 is a relational database management system diagram.

In an additional computer system embodiment, as shown in FIG. 7, a relational database management system (RDBMS) 700 comprises a relational data repository 701 storing investment fact data 702; an aggregation module 703, operatively coupled to the relational data repository comprising one or more investment portfolio products 704, one or more target risk profiles 705, at least one non-guaranteed principal portion 706 per investment portfolio product 704 and at least one guaranteed principal portion 707 per investment portfolio product; a query servicing module 708, operatively coupled to the aggregation module 703, for servicing query statements (query command) 709 generated in response to user input, said query servicing module 708 comprising: a reference generating module 710 for generating a user-defined relationship between one or more investment portfolio products and one or more target risk profiles 711 to aggregated investment fact data 712 generated by the aggregation module 703; and a query processing module 708 for processing a given investment query command 709, wherein upon identifying that the given investment query command 709 is related to said user-defined relationship 711, communicates with said aggregation module 703 over an interface 713 therebetween to retrieve portions of aggregated investment fact data 712 pointed to by said reference that are relevant to said given investment query statement 709.

Figure 8:
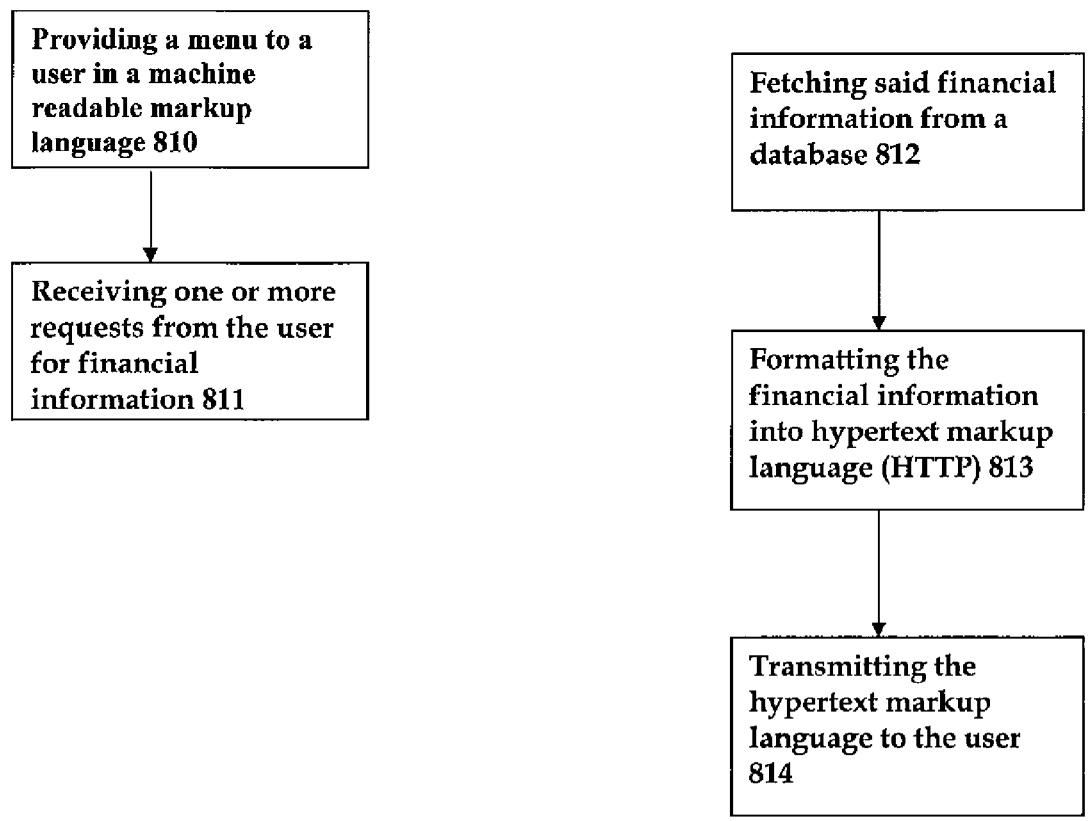
FIG. 8 is a flow chart for illustrating a method of providing an investment portfolio.

In a further additional embodiment as shown in FIG. 8, a method is implemented with one or more processor readable storage devices 801 having processor readable code 802 embodied on at least one processor readable storage device 801, said processor readable code 802 for programming at least one processor 801 to perform a method of providing an investment portfolio 800 comprising the following steps in various order: providing a menu to a user in a machine readable markup language 810; receiving one or more requests from the user for financial information related to said user's portfolio and investment goals 811; fetching said financial information from a database 812; formatting the financial information into hypertext markup language 813, and; transmitting the hypertext markup language to the user 814 wherein the financial information comprises one or more aggregated database objects 815 including one or more target risk profiles 816, one or more investor profiles 817, at least one non-guaranteed principal portions 818, and at least one sum certain guaranteed principal portions 819.

Figure 9:
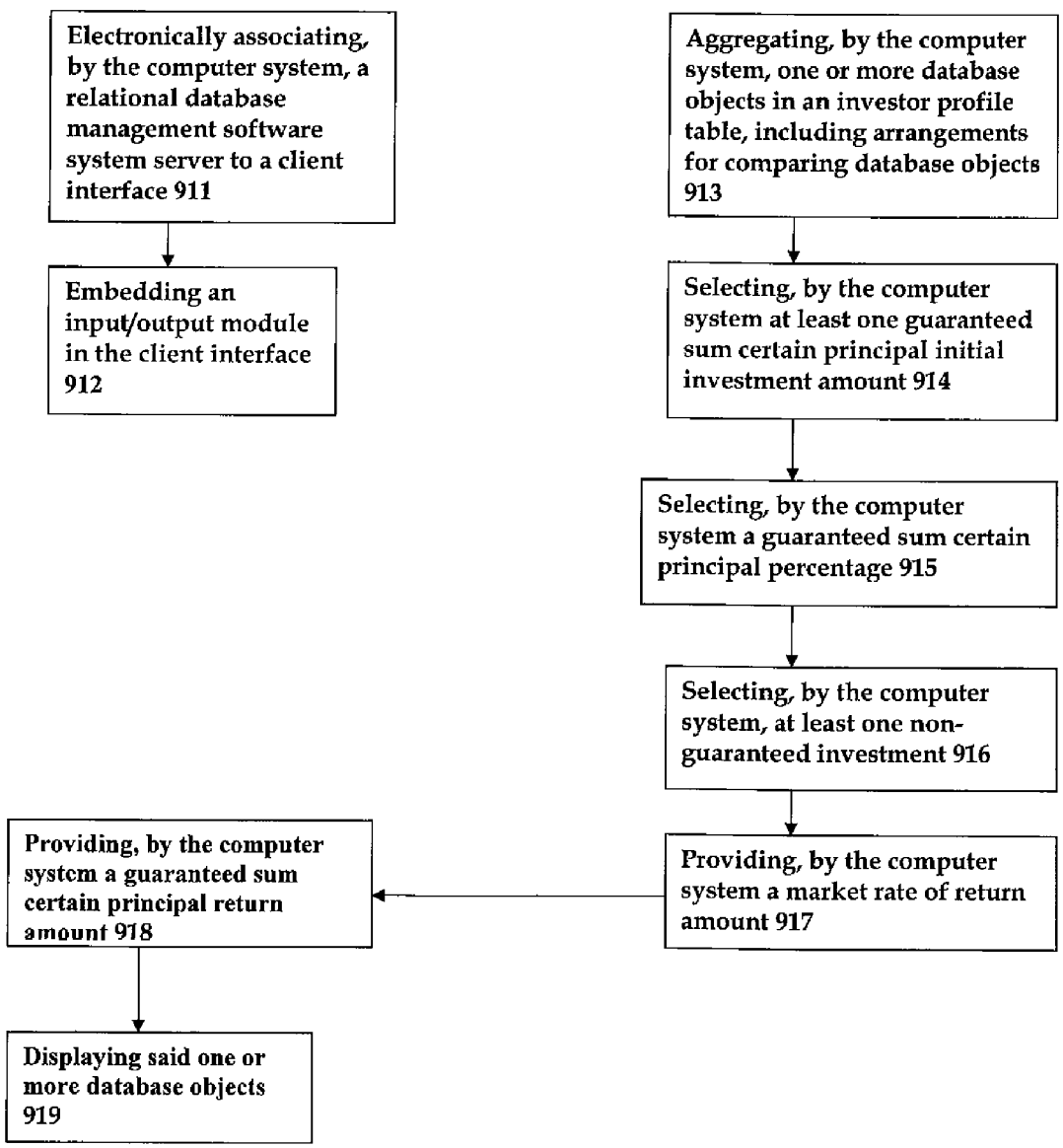
FIG. 9 is a flow chart for illustrating a method of providing an investment portfolio to select at least one guaranteed sum certain principal initial investment amounts.

In a further additional embodiment as shown in FIG. 9, a computer system 900 provides at least one non-guaranteed principal portion 901 wherein a guaranteed principal portion 902 coupled with said non-guaranteed principal portion 901 provide an enhanced market return on a principal investment amount 903 and said enhanced market return comprising at least a guaranteed sum certain principal amount 904, said computer system 900 comprising a data storage medium for storing instructions 905; a bus 906; a memory unit coupled with said bus 907; a processor coupled with said bus 908, said processor 908 for executing a computer implemented method 909 for providing an investment portfolio 910 comprising: electronically associating, by the computer system, a relational database management software system server to a client interface 911; embedding an input/output module in the client interface 912; aggregating, by the computer system, one or more database objects in an investor profile table, including arrangements for comparing the one or more database objects to calculate one or more investor profile ratios; selecting, by the computer system, at least one non-guaranteed investment 913; selecting, by the computer system, at least one guaranteed sum certain principal initial investment amount 914; selecting, by the computer system, a degree of investment risk; selecting, by the computer system, a guaranteed sum certain principal percentage 915; selecting, by the computer system, at least one initial investment amount 916; providing, by the computer system, a market rate of return amount 917; providing, by the computer system, a guaranteed sum certain principal return amount 918; and displaying said one or more database objects 919.

Figure 10:
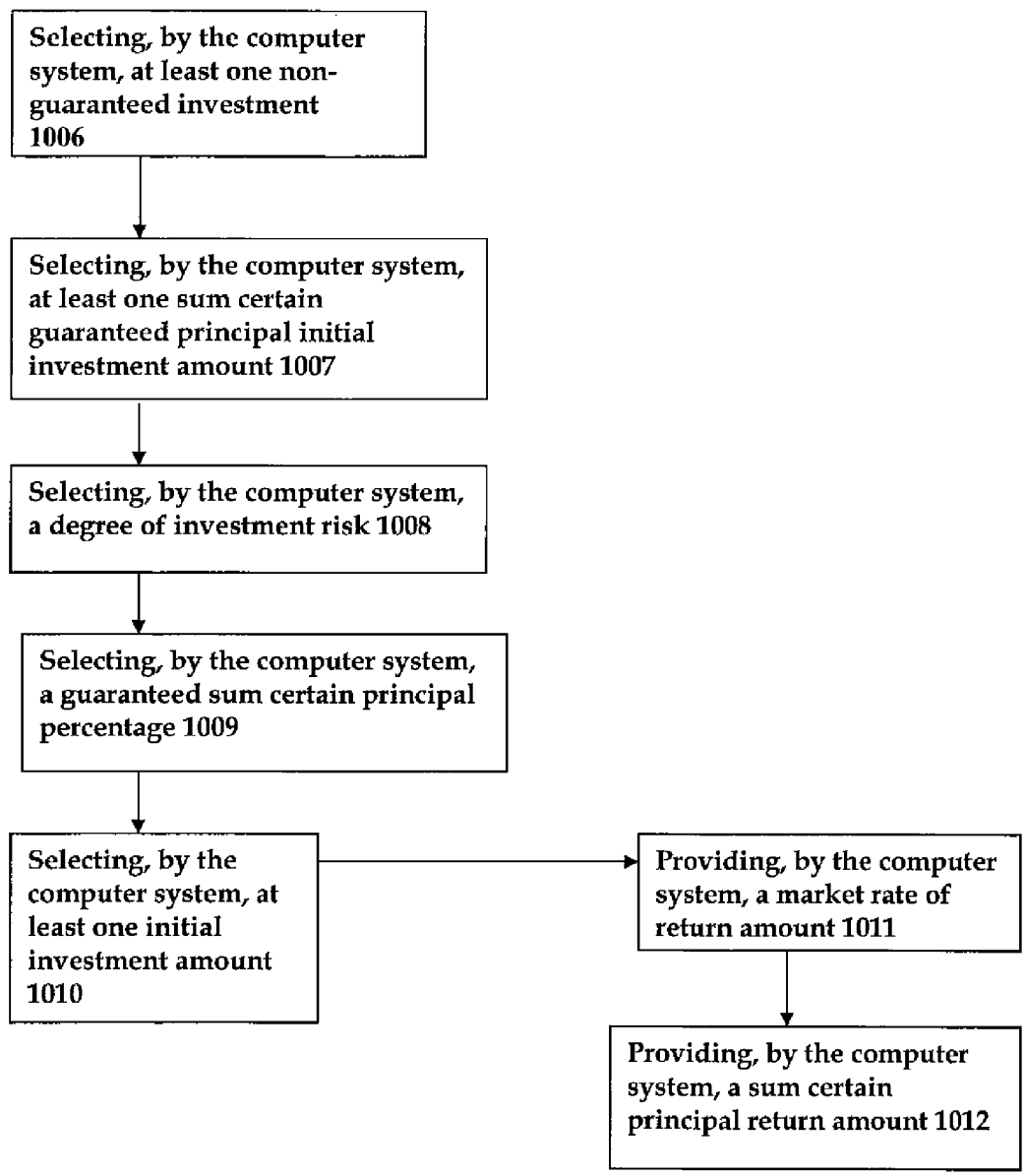
FIG. 10 is a flow chart for illustrating a method of providing an investment portfolio for a sum certain principal return amount.

In a yet additional further embodiment as shown in FIG. 10, a computer system for providing an investment portfolio 1000, comprises a data storage medium for storing instructions 1001; a bus 1002; a memory unit coupled with said bus 1003; a processor coupled with said bus 1004, said processor for executing a computer implemented method for providing an investment portfolio 1005 comprising: selecting, by the computer system, at least one non-guaranteed investment 1006; selecting, by the computer system, at least one sum certain guaranteed principal initial investment amount 1007; selecting, by the computer system, a degree of investment risk 1008; and selecting, by the computer system, a guaranteed sum certain principal percentage 1009; selecting, by the computer system, at least one initial investment amount 1010;

providing, by the computer system, a market rate of return amount 1011; and providing, by the computer system, a sum certain principal return amount 1012.

Figure 11:
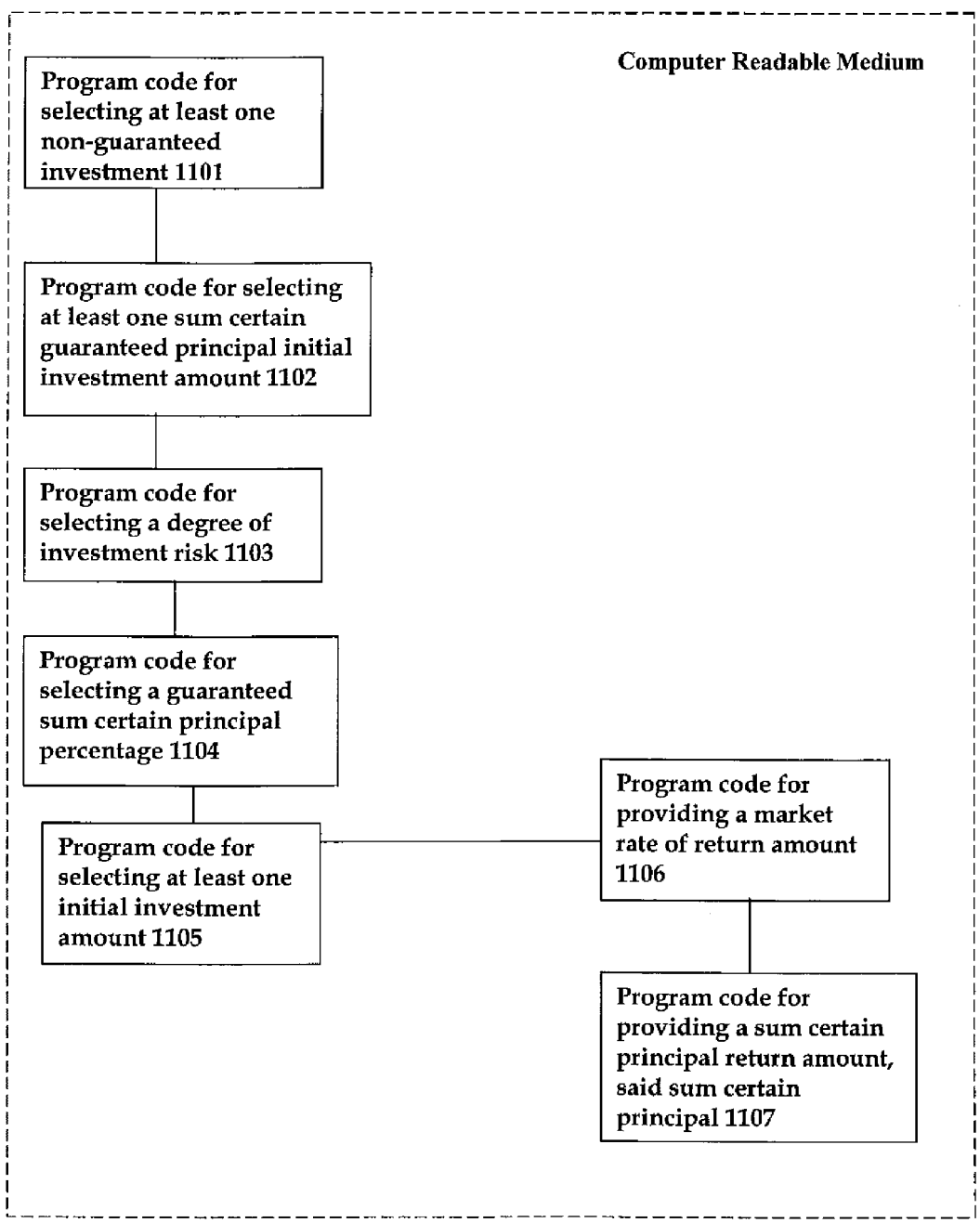
FIG. 11 is a system diagram for providing computer readable medium to provide program code for performing steps in an investment portfolio method.
Figure 12:
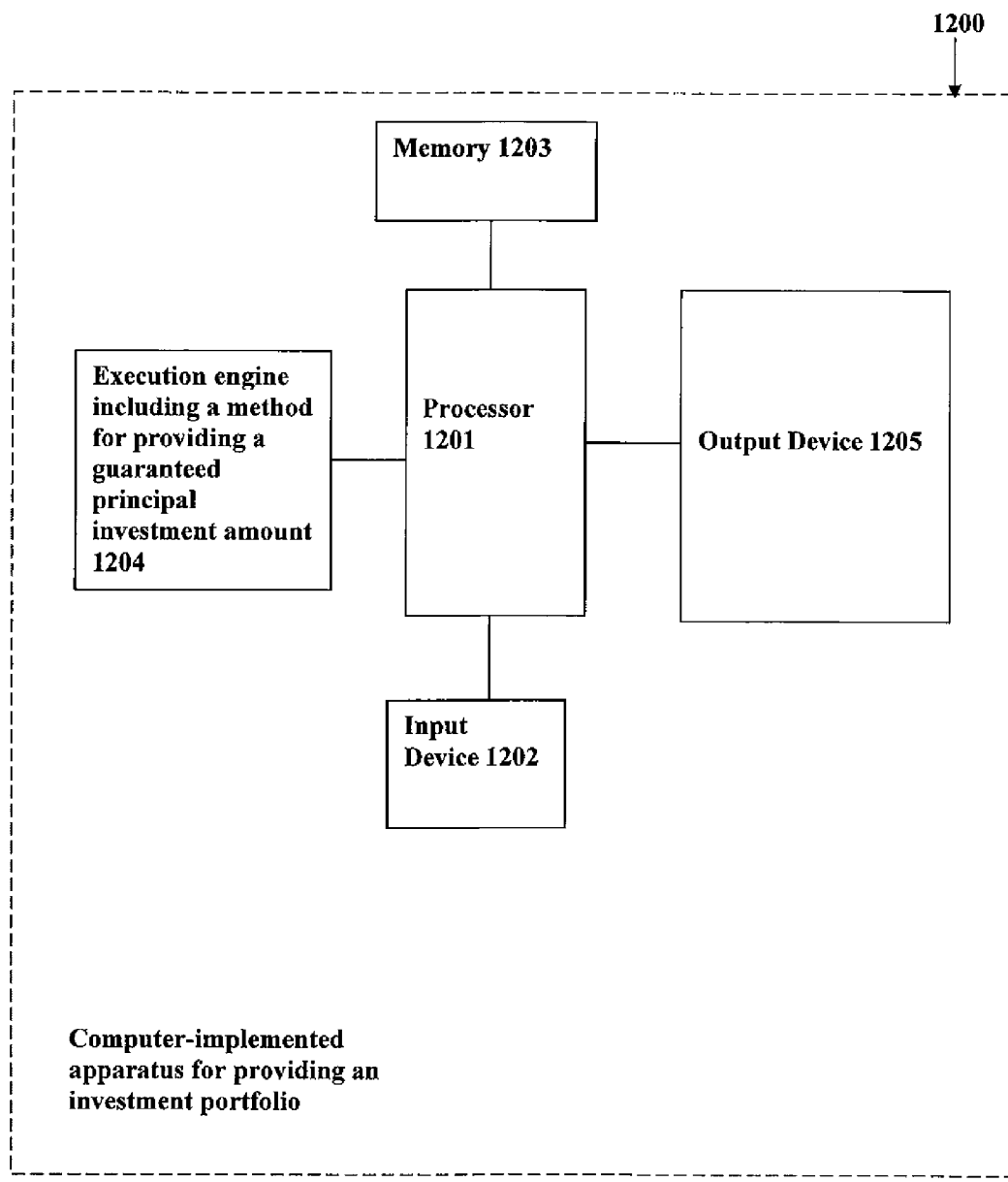
FIG. 12 is a computer implemented apparatus for providing an investment portfolio including an execution engine for providing a guaranteed principal investment amount.

In an additional further embodiment, as shown in FIG. 11, a computer-usable medium having computer-readable program code embodied therein for controlling a processor for executing a method for providing an investment portfolio 1100 comprises: program code for selecting at least one non-guaranteed investment 1101; program code for selecting at least one guaranteed sum certain principal initial investment amount 1102; program code for selecting a degree of investment risk 1103; program code for selecting a guaranteed sum certain principal percentage 1104; program code for selecting at least one initial investment amount 1105; program code for providing a market rate of return amount 1106; and program code for providing a guaranteed sum certain principal return amount 1107.

In a yet additional further embodiment, a computer-implemented apparatus for providing an investment portfolio 1200, said apparatus comprises a processor 1201; an input device coupled to said processor 1202; a memory coupled to said processor 1203; an execution engine including a method for providing a guaranteed principal investment system executable by said processor 1204; and an output device 1205.

Figure 13:
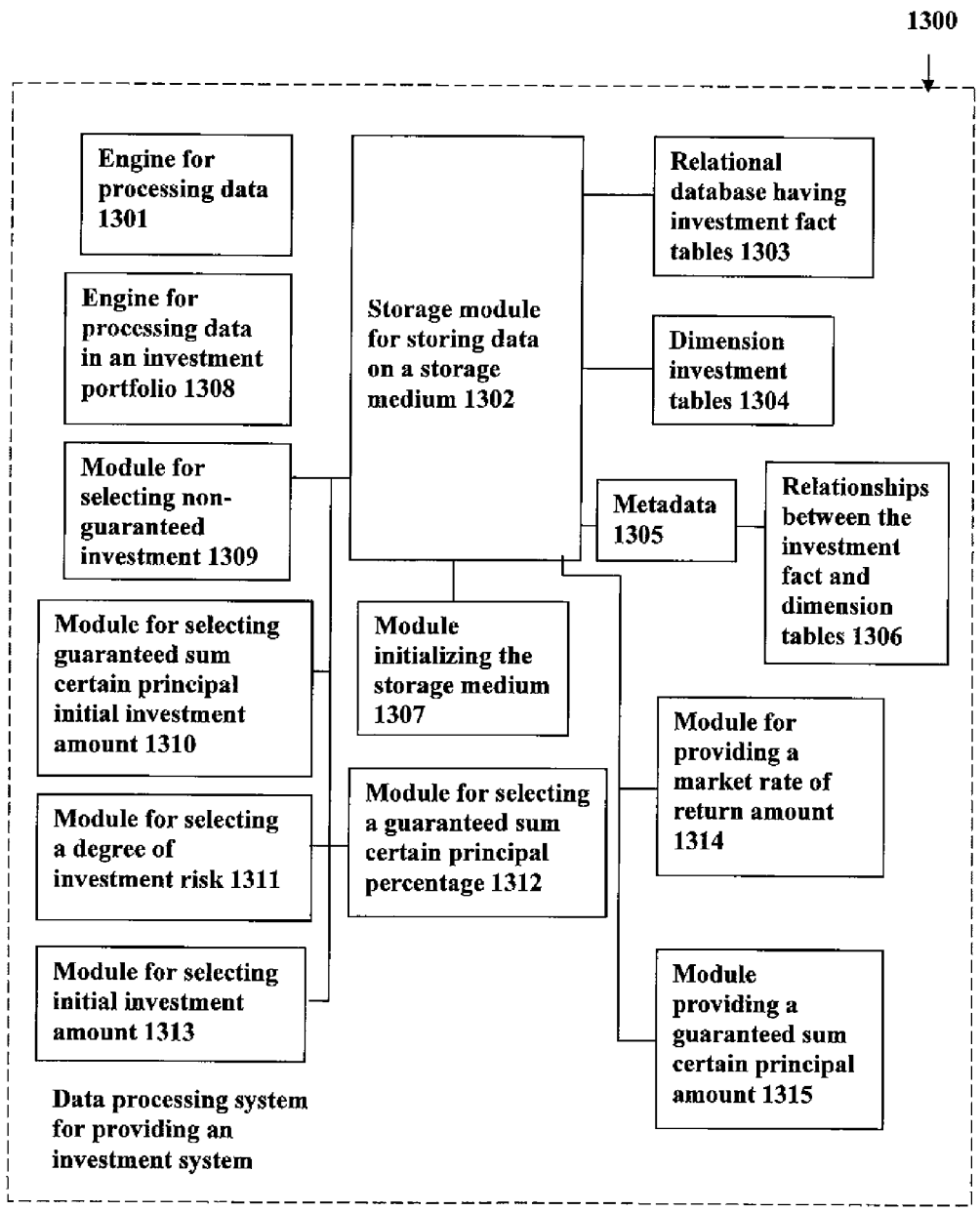
FIG. 13 is a system diagram for a data processing system for providing an investment system including a module for providing a market rate of return amount and a guaranteed sum certain principal amount.

In an additional computer systems embodiment a shown in FIG. 13, a data processing system for providing an investment system 1300, comprises an engine for processing data 1301; a storage module for storing data on a storage medium 1302 wherein said storage module 1302 contains a relational database having investment fact tables 1303, dimension investment tables 1304 and metadata 1305 describing the relationships between the investment fact and dimension tables 1306; a module initializing the storage medium 1307; an engine for processing data in an investment portfolio 1308; a module for selecting at least one non-guaranteed investment 1309; a module for selecting at least one guaranteed sum certain principal initial investment amount 1310; a module for selecting a degree of investment risk 1311; a module for selecting a guaranteed sum certain principal percentage 1312; a module for selecting at least one initial investment amount 1313; a module for providing a market rate of return amount 1314; and a module providing a guaranteed sum certain principal amount 1315, said guaranteed sum certain principal amount being less than the total initial investment amount.

Figure 14:
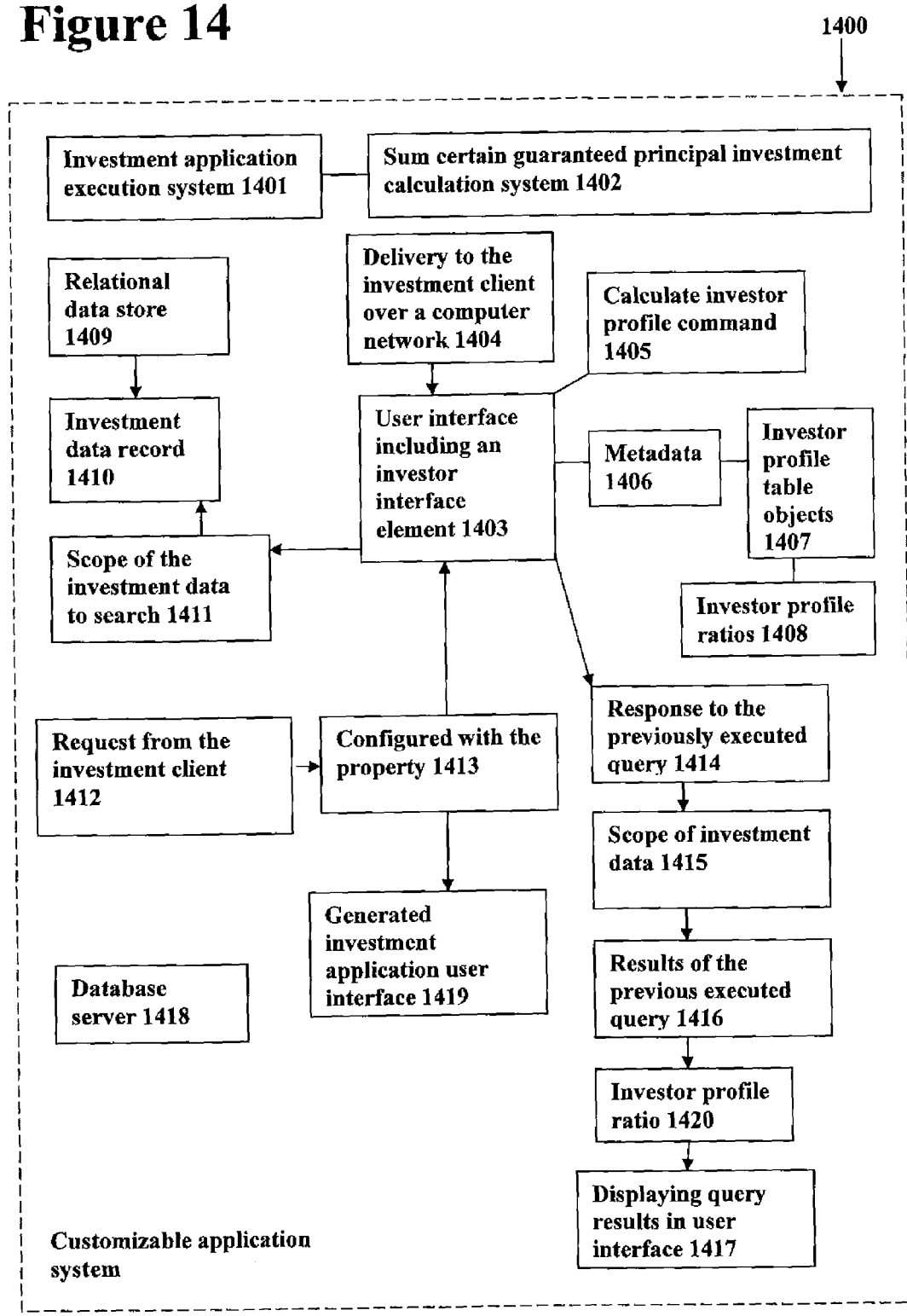
FIG. 14 is a system diagram for a customizable application system for displaying query results in a user interface.

In an additional embodiment as shown in FIG. 14, a customizable application system 1400 comprises an investment application execution system 1401 configured to support a sum certain guaranteed principal investment calculation system 1402; a user interface including an investor interface element 1403, the investment application user interface being configured for delivery to the investment client over a computer network 1404, the investment interface element including a calculate investor profile command 1405; metadata 1406 characterizing the one or more investor profile table objects 1407 to create the one or more investor profile ratios 1408 and related investor profile calculate command 1405; a relational data store 1409 including an investment data record 1410 further characterizing the calculate investor profile command 1405, the investment data record 1410 being user modifiable in response to receiving input from an investment user defining a property for the user customizable calculate investor profile command 1405 and being accessible using the metadata 1406, the property specifying the scope of the investment data to search 1411, wherein the investment application user interface 1403 is automatically generated in response to a request from the investment client 1412 and configured with the property 1413 for the one or more investor profile table objects 1407 to create the one or more investor profile ratios calculate command 1405, wherein the investment user interface 1403 is operable to display an amount of data in response to the previously executed query 1414, and wherein the one or more investor profile table objects 1407 to create the one or more investor profile ratios calculate command 1405 is operable to calculate an investor profile ratio 1420 within the scope of investment data 1415 with respect to the results of the previous executed query 1416, said executed search including steps of: displaying said subset query results in said investment application user interface 1417; operating said single instance of an investment application user interface independently from a database server 1418; and providing said database server independently from the number of query operations required to retrieve a requested query result to allow an investment user to include configuration data and personalization data in said generated investment application user interface 1419.

Figure 15:
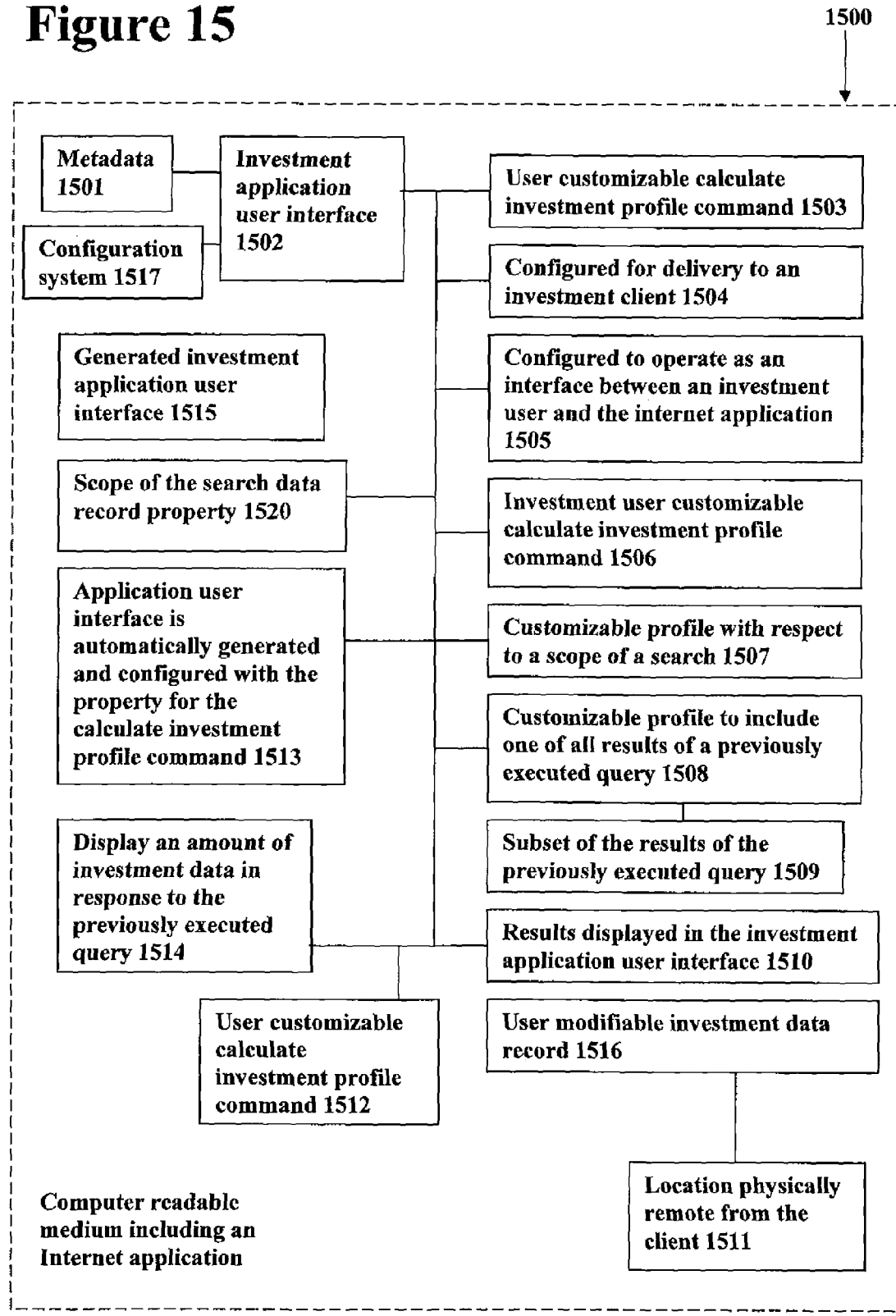
FIG. 15 is a system diagram for computer readable medium including an internet application.

In an additional embodiment as shown in FIG. 15, a computer readable medium including an internet application 1500, the Internet application comprises metadata 1501 defining an investment application user interface 1502, the investment application user interface including a user interface element with a user customizable calculate investment profile command 1503, the investment application user interface configured for delivery to an investment client 1504 and configured to operate as an interface between an investment user and the internet application 1505, the investment user customizable calculate investment profile command 1506 being customizable with respect to a scope of a search 1507, the scope of the search being customizable to include one of all results of a previously executed query 1508, a subset of the results of the previously executed query 1509, and only the results of the previously executed query that are displayed in the investment application user interface 1510; an investment user interface generator configured to generate the investment application user interface in response to a request from the investment user using a user modifiable investment data record 1516 stored in a location physically remote from the client 1511, the user modifiable investment data record 1516 configurable to characterize the user customizable calculate investment profile command 1512; and a configuration system 1517 configured to receive an input from an investment user to modify the user modifiable data record with a property for the calculate investor profile command 1506, the property 1520 specifying the scope of the search, wherein the investment application user interface is automatically generated and configured with the property for the calculate investment profile command 1513, wherein the investment user interface is operable to display an amount of investment data in response to the previously executed query 1514, and wherein the calculate investment profile command is operable to execute a search within the scope of search with respect to the results of the previously executed query, independently from a database server, said database server independent from the type of data stored in the database server and the number of query operations required to retrieve a requested query result allowing an investment user to include configuration data and personalization data in the generated investment application user interface 1515.

Figure 16:
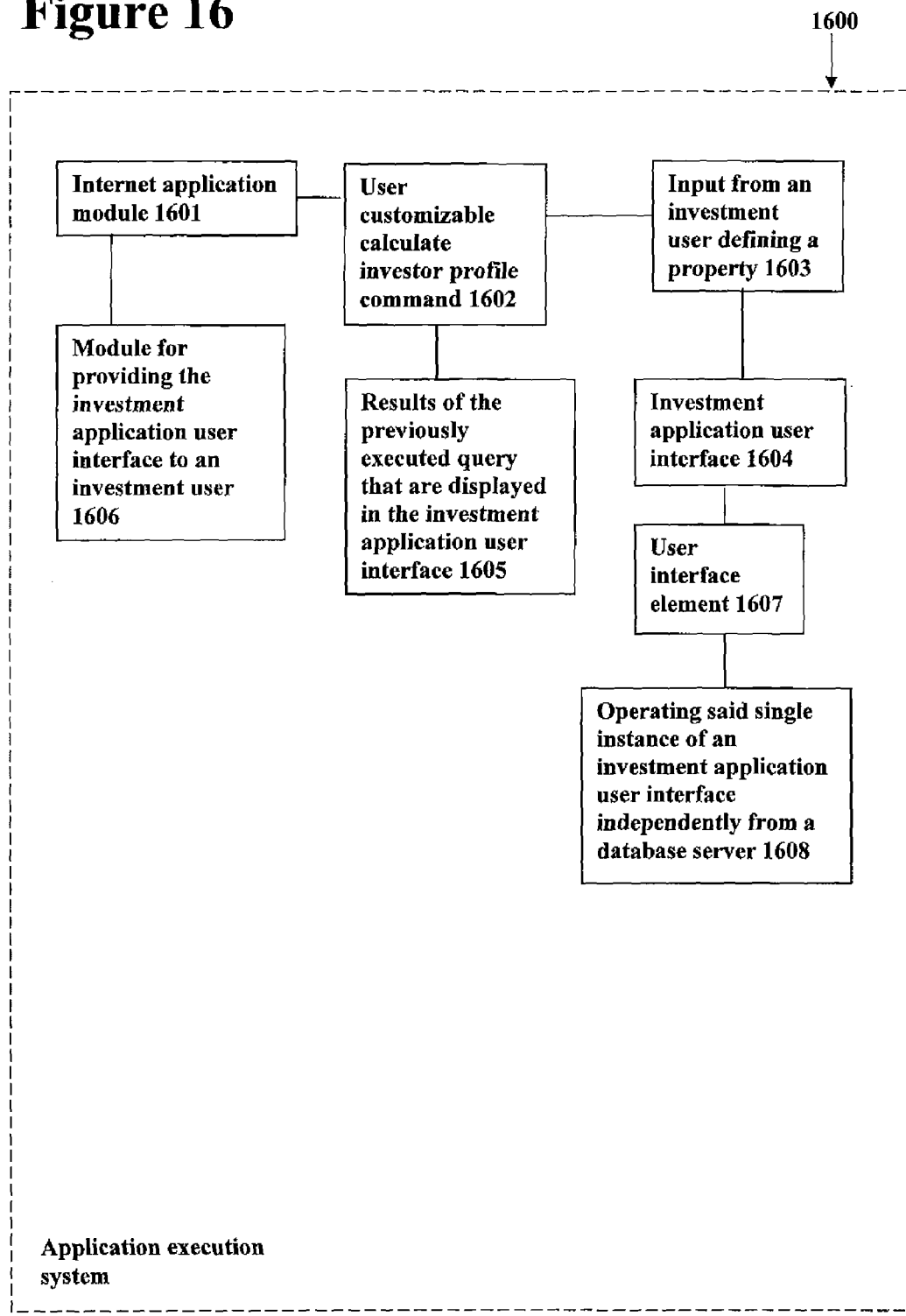
FIG. 16 is an application execution system for providing a single instance of an investment application user interface independently from a database server.

In an additional embodiment as shown in FIG. 16, an application execution system 1600 comprises an Internet application module 1601; a module for generating an investment application user interface 1604 using a user modifiable data record configured to store investment data characterizing a user customizable calculate investor profile command 1602 in response to receiving input from an investment user defining a property 1603 for the user customizable calculate investor profile command 1602, wherein the investment application user interface 1604 is automatically configured with the property for the calculate investor profile command 1602, the user customizable interface comprising the calculate investor profile command 1602 being customizable based on the property 1603 received and customizable to include one of all results of a previously executed query, a subset of the results of the previously executed query, and only the results of the previously executed query that are displayed in the investment application user interface 1605; and a module 1606 for providing the investment application user interface to an investment user, the investment application user interface including a user interface element 1607, the investment application user interface configured as an interface between the Internet application and the investment user, the user interface element 1607 including the user customizable calculate investor profile command 1602, the user interface element 1607 configured for delivery to a client over a computer network, wherein the investment application user interface 1605 is operable to display an amount of investment data in response to the previously executed query, and wherein the calculate investor profile command 1602 is operable to calculate with respect to the results of the previously executed query, operating said single instance 1608 of an investment application user interface independently from a database server, said database server independent from the number of query operations required to retrieve a requested query result and independent from the type of data stored in the database server, allowing an investment user to include configuration data and personalization investor profile data in the generated application user interface.

Figure 17:
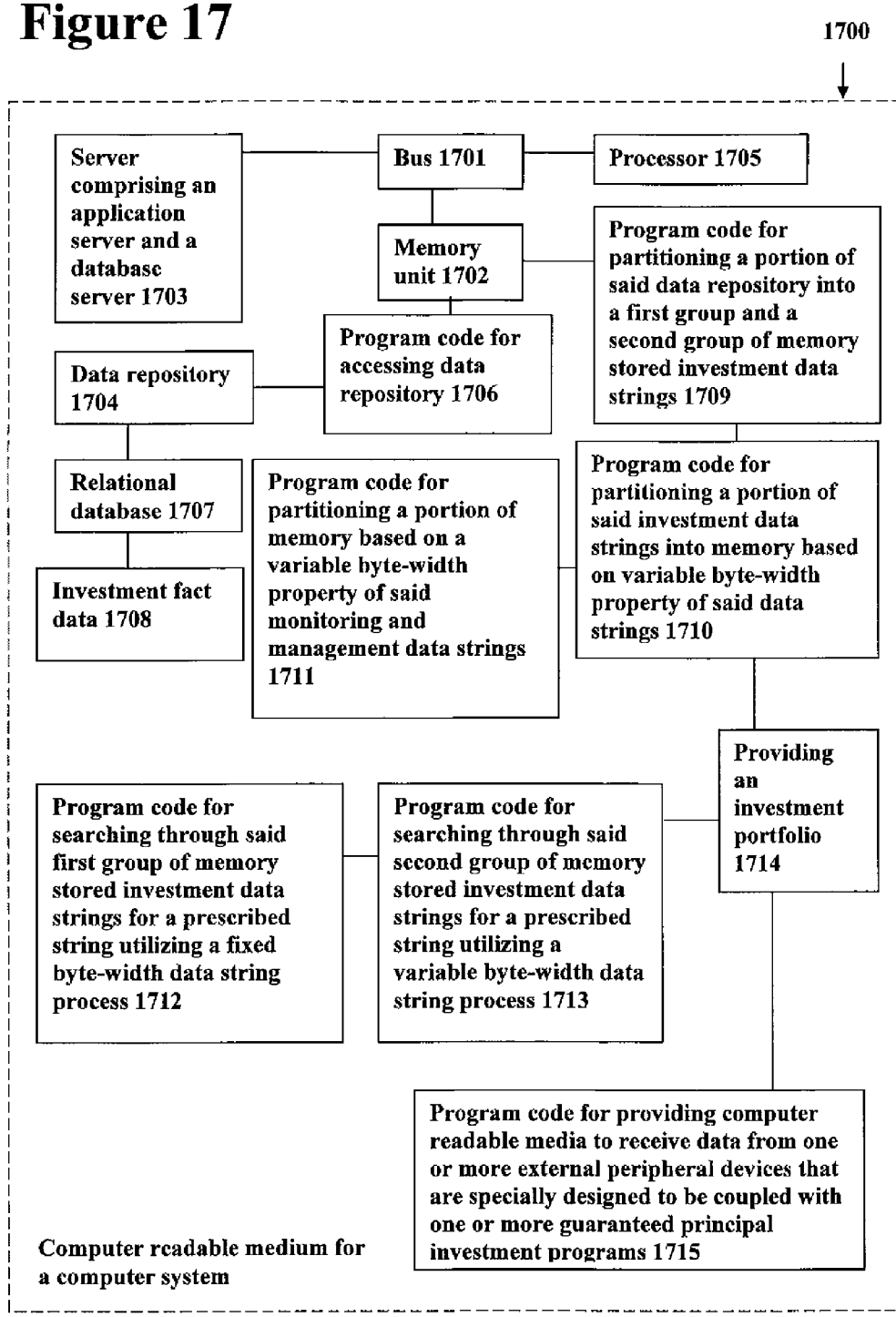
FIG. 17 is a system diagram for providing a computer readable medium for a computer system including program code for providing a method of coupling one or more guaranteed principal investment programs utilizing a fixed byte-width data string and a variable byte-width data string process.

In an additional embodiment as shown in FIG. 17, a computer readable medium for a computer system 1700 comprises a bus 1701; a memory unit coupled with said bus 1702; a thin client, a server comprising an application server and a database server 1703, a data repository 1704, a processor coupled with said bus 1705, said processor for executing a method for providing methods and products providing a investment portfolio product including a guaranteed principal amount: program code for accessing said data repository 1706, said data repository further comprising a relational database 1707 wherein said relational database contains investment fact data 1708; program code for partitioning a portion of said data repository into a first group and a second group of memory stored investment data strings 1709; program code for partitioning a portion of said investment data strings into said first group of memory stored investment data strings, said partitioning into said first group based on a variable byte-width property of said monitoring and management data strings 1710; program code for partitioning a portion of said investment data strings into said second group of memory stored investment data strings, said partitioning into said second group based on a variable byte-width property of said monitoring and management data strings 1711; program code for searching through said first group of memory stored investment data strings for a prescribed string utilizing a fixed byte-width data string process 1712; program code for searching through said second group of memory stored investment data strings for a prescribed string utilizing a variable byte-width data string process 1713, wherein the execution of said fixed byte-width investment data string process is more efficient than the execution of said variable byte-width investment data string process to implement various steps to implement financial services that may be provided and included in various forms of computer readable media utilizing a computer implemented method for providing an investment portfolio 1714; and program code for providing computer readable media to receive data from one or more external peripheral devices that are specially designed to be coupled with one or more guaranteed principal investment programs 1715.

Figure 18:
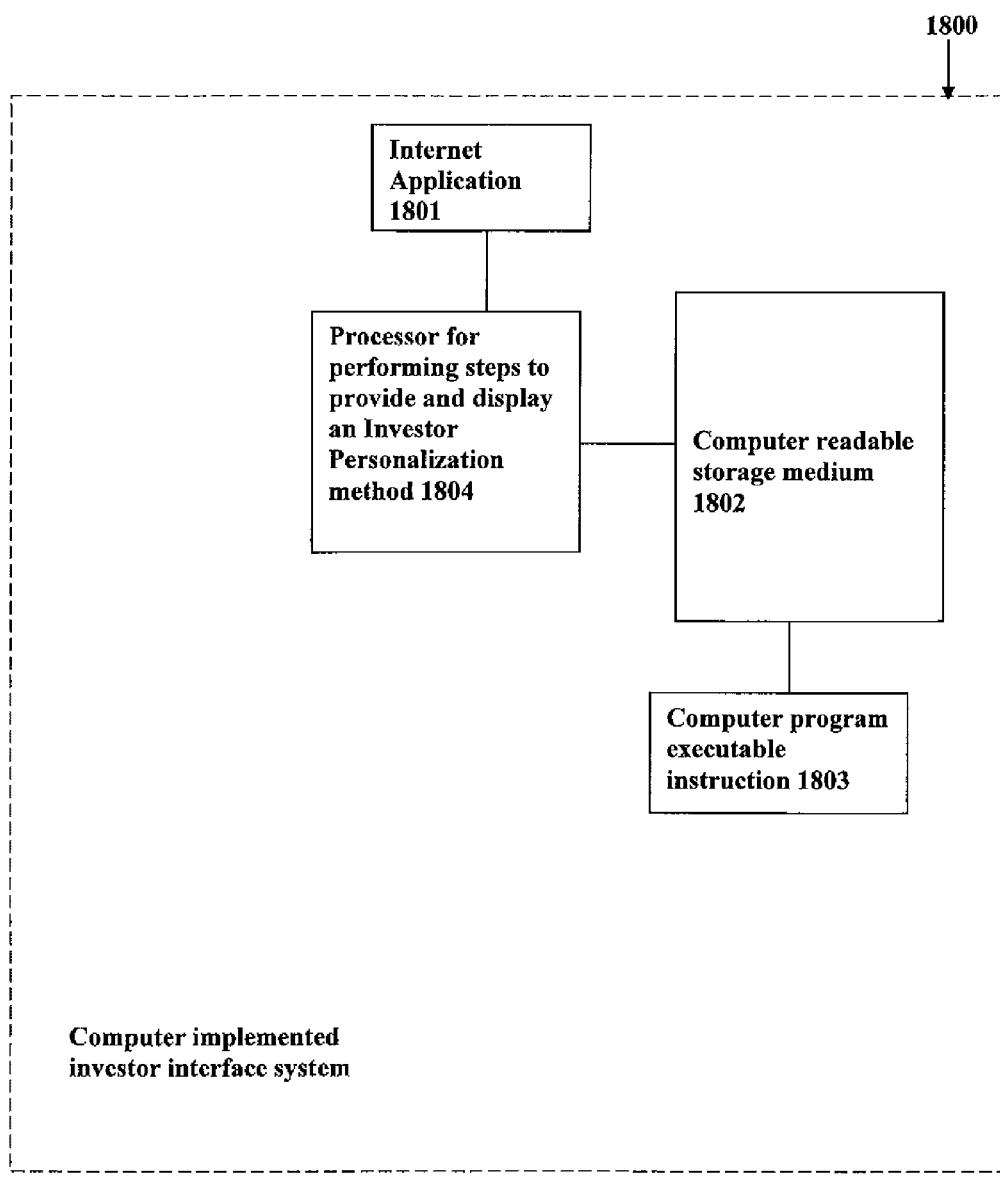
FIG. 18 is a system diagram for a computer implemented investor interface system.

In an additional embodiment as shown in FIG. 18, a computer implemented investor interface system 1800 includes an Internet application 1801, a computer readable storage medium 1802, a computer program executable instruction, recorded on the computer readable storage medium 1803 and a processor for performing steps 1804, the steps comprising: providing a user interface element on a single instance of an investor application user interface to display calculate financial data results in response to a previously executed query, independently from a database server and independent from the number of query operations required to retrieve a requested query result and independent from the type of data stored in the database server, allowing an investor user to include configuration data and personalization data in the generated application user interface 1805; allowing an investor end user to select from a plurality of investment portfolio products wherein said plurality of investment portfolio products are coupled to a plurality of investment query results and independent from the investment data type stored in the database server allowing an investor user to include configuration data and personalisation data in the generated application user interface 1806; configuring a user modifiable data record in response to a request from said investor end user 1807; and providing a calculate investor profile command operable to search a subset including only the results of the previously executed query 1808.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A computer-implemented customizable application system including a non-transitory computer-readable medium having non-transitory computer-readable program codes embodied therein configured by the computer system as an investment application execution system to provide a sum certain guaranteed principal investment calculation system comprising:

a user interface generator operable to provide an investment application user interface including a calculate investor profile command and an investor interface element communicating with at least one investment client and a plurality of investment application execution system users, wherein the investment application user interface is configurable for delivery to a plurality of investment clients over a computer network, capable of displaying queried data, and operable to create at least one calculate investor profile command using a property for at least one investor profile table object;

at least one metadata comprising of investment metadata and associated with the at least one investor profile table object causing to create the at least one calculate investor profile command;

a relational data store including an investment data record capable of being searched with a find command, wherein the relational data store is modifiable in response to receiving input from each of the plurality of investment application execution system users defining a property to customize the calculate investor profile command and a scope of a plurality of investment data records, configurable using configuration data and personalization data provided by each of the plurality of investment application users, and accessible by associating with each of the plurality of metadata and the input from each of the plurality of investment application execution system users; and a database server enabled with the find command for querying the relational data store using each of the plurality of metadata and the input from each of the plurality of investment application execution system users, wherein the database server operable to perform a plurality of queries independently and to configure the queried data based on each of the plurality of investment application execution system users' configuration data, and personalization data, wherein the at least one investor profile table objects to create the at least one calculate investor profile calculate command is operable to execute a search within the scope of the plurality of investment data records with respect to results of a previously executed query, the previously executed query including steps of displaying a subset query results in the investment application user interface, operating a single instance of the investment application user interface independently from the database server, and providing the database server independently from a number of query operations required to retrieve a requested query result to allow each of the plurality of investment application execution system users to include configuration data and personalization data in the investment application user interface without modification of a user interface design developed in page development.

2. The computer-implemented customizable application system of claim 1 wherein the relational data store further comprises a relational database management system comprising:

an aggregation module operatively coupled to the relational data store including a plurality of investment portfolio products, a plurality of target risk profiles, wherein the plurality of investment portfolio products has at least one non-guaranteed principal portion per investment portfolio product and at least one guaranteed principal portion per investment portfolio product; and a query servicing module operatively coupled to the aggregation module for providing query statements in response to the input from each of the investment application execution system users, wherein the query servicing module comprises reference generating module for generating a user-defined relationship between the plurality of investment portfolio products and the plurality of target risk profiles and referencing the user-defined relationship to aggregated investment fact data generated by the aggregation module and wherein the query servicing module includes a query processing module for processing a given investment query statement by confirming with the user-defined relationship and retrieving a portion of the aggregated investment fact data referenced using the user-defined relationship and associated with the given investment query statement.

3. The computer-implemented customizable application system of claim 2 wherein the reference generating module for generating the user-defined relationship further generates a relationship between at least one non-guaranteed principal portion per investment portfolio product and at least one guaranteed principal portion per investment portfolio product.

4. The computer-implemented customizable application system of claim 2 wherein the plurality of investment portfolio products further has a non-guaranteed principal portion coupled with a guaranteed principal investment portion to for generating a return on an initial investment amount, by providing the return including at least a predetermined sum certain principal amount.

5. The computer-implemented customizable application system of claim 2 wherein the plurality of target risk profiles are coupled with the investment portfolio products comprising the investment portfolio products and a guaranteed principal portion coupled with a non-guaranteed principal portion for generating a return on an initial investment amount by providing the return including at least a predetermined guaranteed sum certain principal amount.

6. The computer-implemented customizable application system of claim 2 wherein the plurality of investment portfolio products further comprises:

at least one guaranteed principal portion, and wherein the guaranteed principal portion coupled with the non-guaranteed principal portion provides an enhanced market return on an initial investment amount, the return comprising at least a predetermined guaranteed sum certain principal amount.

7. The computer-implemented customizable application system of claim 2 wherein the guaranteed principal portion comprises one or more annuities.

8. The computer-implemented customizable application system of claim 2 wherein the non-guaranteed principal portion includes at least one equity-indexed annuity.

9. The computer-implemented customizable application system of claim 2 wherein the non-guaranteed principal portion is one of a group consisting of a mutual fund, an exchange traded fund, an individual stock, a commodity and a stock option.

10. The computer-implemented customizable application system of claim 2 wherein a guaranteed sum certain principal is greater than zero and less than the initial investment.

11. The computer-implemented customizable application system of claim 1, wherein the investment application user interface is configured for displaying at the investment client using standard web browsing protocols.

12. The computer-implemented customizable application system of claim 1, wherein said non-transitory computer readable medium is further encoded with an investment personalization system configured to modify the investment data record.

13. The computer-implemented customizable application system of claim 1, wherein the investment application user interface is configured to display at the investment client using features of a web browser, the features not requiring a browser add-on, plug-in or extension.

14. The computer-implemented customizable application system of claim 1 wherein the find command is configurable according to an identity of the investment client or to an identity of an investment application execution system user.

15. The computer-implemented customizable application system of claim 1, wherein said non-transitory computer readable medium is further encoded with a module for generating the investment application user interface using the plurality of metadata.

16. The computer-implemented customizable application system of claim 1, further including an application server configured to support the Internet application.

17. The computer-implemented customizable application system of claim 1, wherein said non-volatile computer readable medium is further encoded with another investment application user interface having the find command, wherein the investment data record is configured to characterize the find command in both the investment application user interface and the at least another investment application user interface.

18. The computer-implemented customizable application system of claim 1, wherein the investment client is a wireless client.

* * * * *